US012251706B2

(12) United States Patent
Warbis et al.

(10) Patent No.: US 12,251,706 B2
(45) Date of Patent: Mar. 18, 2025

(54) DEVICE, METHOD, AND CONTROL SYSTEM FOR WASTE TO ENERGY GENERATION AND OTHER OUTPUT PRODUCTS

(71) Applicant: Ekamor Resource Corporation, Cookeville, TN (US)

(72) Inventors: Kelly Warbis, Cookeville, TN (US); Michael Idelchik, Cookeville, TN (US)

(73) Assignee: Ekamor Resource Corporation, Cookeville, TN (US)

( * ) Notice: Subject to any disclaimer, the term of this patent is extended or adjusted under 35 U.S.C. 154(b) by 0 days.

(21) Appl. No.: 18/519,624

(22) Filed: Nov. 27, 2023

(65) Prior Publication Data

US 2024/0100539 A1 Mar. 28, 2024

Related U.S. Application Data

(63) Continuation of application No. 17/825,344, filed on May 26, 2022, now Pat. No. 11,850,601.
(Continued)

(51) Int. Cl.
*B02C 23/10* (2006.01)
*B02C 21/00* (2006.01)
(Continued)

(52) U.S. Cl.
CPC .............. *B02C 23/10* (2013.01); *B02C 23/24* (2013.01); *B03C 1/02* (2013.01)

(58) Field of Classification Search
CPC ......... B02C 23/10; B02C 23/24; B02C 25/00; B02C 2201/06
See application file for complete search history.

(56) References Cited

U.S. PATENT DOCUMENTS 3,369,761 A * 2/1968 Hand ...................... B02C 25/00 241/33
6,491,242 B1 12/2002 Dingee, IV et al.
(Continued)

FOREIGN PATENT DOCUMENTS

CN 208928354 U 6/2019
JP 101028833 B1 * 4/2011
KR 101119068 B1 3/2012

OTHER PUBLICATIONS

English translate (KR101028833B1), retrieved date Jan. 9, 2024.*

*Primary Examiner* — Mohammed S. Alawadi
(74) *Attorney, Agent, or Firm* — ArentFox Schiff LLP

(57) ABSTRACT

Aspects of the present disclosure include devices, systems, methods, and control systems for processing a feedstock into an output product having variable preselected characteristics. Various system components may include: 1) a feeder configured to convey the feedstock; 2) a mechanical pulverizer configured to pulverize the feedstock received by the feeder into pulverized feedstock; and 3) an air conveyor for conveying an air flow into the mechanical pulverizer and to draw the air flow from the mechanical pulverizer to a fines separator. The pulverized feedstock includes one or more of heavy fines, particulates, moisture, or combinations thereof. The air flow from the mechanical pulverizer includes at least a portion of the pulverized feedstock, wherein the portion of the pulverized feedstock is conveyed by the air flow.

17 Claims, 25 Drawing Sheets

Related U.S. Application Data

(60) Provisional application No. 63/293,981, filed on Dec. 27, 2021.

(51) Int. Cl.

| | |
|---|---|
| ***B02C 23/08*** | (2006.01) |
| ***B02C 23/14*** | (2006.01) |
| ***B02C 23/24*** | (2006.01) |
| ***B03C 1/02*** | (2006.01) |

(56) References Cited

U.S. PATENT DOCUMENTS

| | | | | |
|---|---|---|---|---|
| 6,588,686 | B2 | 7/2003 | Dingee, IV et al. | |
| 8,006,406 | B2 | 8/2011 | Dingee, IV | |
| 9,700,896 | B1 | 7/2017 | Gitschel | |
| 2002/0002208 | A1 | 1/2002 | Martel et al. | |
| 2014/0014748 | A1 | 1/2014 | Zeeck | |
| 2015/0017313 | A1 | 1/2015 | Zeeck | |
| 2015/0121870 | A1 | 5/2015 | Delson et al. | |
| 2015/0308679 | A1* | 10/2015 | Delson | B02C 23/24 241/23 |
| 2018/0036803 | A1 | 2/2018 | Yamamoto | |
| 2021/0252523 | A1 | 8/2021 | Warbis et al. | |

* cited by examiner

Municipal Solid Waste

MSW Fluff

Clean Coal

Municipal Solid Waste (MSW)

MSW Fluff

SynGas (SNG)

Feedstock Enters
Scale
Reject /Hold
D
Proceed
Tip Floor
Loader/ Grapple
1501
1505
V
Conveyer
1510
M
SFC
V
Hazardous Material Data Bus
Maintenance Data Bus
SCAN & Flow Control Bus
IRT & Verification Video Bus
RF/WLAN Data Comms
Pulverizer
1515
Material Analyzer
1520
Moisture Data
1525
Ballistic Separator
1535
Calorific Data
OR Gate
1540
Processing Recycling 1545
1401
1402
1403
1404
A.I. SYS FIG. 14
1530

DEVICE, METHOD, AND CONTROL SYSTEM FOR WASTE TO ENERGY GENERATION AND OTHER OUTPUT PRODUCTS

CROSS-REFERENCE TO RELATED APPLICATIONS

This application is a continuation of U.S. patent application Ser. No. 17/825,344, filed May 26, 2022, which claims the benefit of U.S. Provisional Patent Application No. 63/293,981, filed Dec. 27, 2021, and hereby incorporates by reference herein the contents of each of these applications. This application is also related to co-pending U.S. patent application Ser. No. 18/240,880 titled "DEVICE, METHOD, AND CONTROL SYSTEM FOR WASTE TO ENERGY GENERATION AND OTHER OUTPUT PRODUCTS," filed Aug. 31, 2023, which is a continuation of U.S. patent application Ser. No. 17/133,073 titled "DEVICE, METHOD, AND CONTROL SYSTEM FOR WASTE TO ENERGY GENERATION AND OTHER OUTPUT PRODUCTS," filed Jun. 28, 2019 (now U.S. Pat. No. 11,786,911, issued Oct. 17, 2023), which is a continuation of U.S. patent application Ser. No. 16/457,431 titled "DEVICE, METHOD, AND CONTROL SYSTEM FOR WASTE TO ENERGY GENERATION AND OTHER OUTPUT PRODUCTS," filed Jun. 28, 2019, now U.S. Pat. No. 10,898,903, issued Jan. 26, 2021, which claims priority to U.S. Provisional Application No. 62/692,369 titled "DEVICE, METHOD, AND CONTROL SYSTEM FOR WASTE TO ENERGY GENERATION AND OTHER OUTPUT PRODUCTS," filed Jun. 29, 2018, each of which is incorporated herein by reference in its entirety.

TECHNICAL FIELD

Aspects of the disclosure relate generally to the field of waste processing and production of energy and other output products, such as synthetic gas, pyrolysis products, and soil additives.

BACKGROUND

There remains an unmet need for methods, systems, devices, and control systems for processing waste into usable products, such as synthetic gas, pyrolysis products, and soil additives.

SUMMARY

Aspects of the present disclosure include devices, systems, methods, and control systems for processing waste into usable products, such as synthetic gas, pyrolysis products, and soil additives.

Aspects of the system may include processing of one or more feedstocks that may include, for example, garbage (including organics), biosolids, agricultural waste, paper pulp, green waste, digestate, and/or other biomass, as well as other materials. The feedstocks may be dried and otherwise processed, such as by pulverizing, which, among other things, may result in production of water from the drying and other processing.

Various components of an example system for processing of the waste in accordance with aspects of the present disclosure may include one or more of: 1) a material loading area, which may arrive for example, on a tipping floor area; 2) a shredder; 3) a magnet based separator; 4) an eddy current non-magnetic metals separator; 5) additional sorting devices, such as a ballistic separator and/or an optical separator, optionally including one or more sorting observation areas; 6) a mechanical separator, which may include or further include one or more ringmills, horizontal hammermills or vertical shaft impactors (VSIs); 7) one or more material separation devices, such as one or more cyclones; 8) an air conveyor, for example, a blower or a fan, 9) a compressor, such as one or more ram balers; 10) a packager, such as one or more bale wrappers; and 11) one or more material analyzers, such as moisture and caloric data analysis and collection devices.

In one example implementation, the system may include various enhanced features for dewatering/drying a variety of organic feedstock, including one or more of the following: 1) a shredder; 2) a mechanical pulverizer, such as a ringmill, a horizontal hammermill, or a vertical shaft impactor (VSI); 3) a variable or relatively constant velocity air conveyor (such as a blower or a fan) that pulls high velocity air through the pulverizer, cyclone, bag-house, and/or other air filtration systems as may be required by local regulations, for example; 4) specially designed screens to control size of air-conveyed feedstock exiting the pulverizer and facilitate residence time of the pre-sorted feedstock in the pulverizer; 5) a cyclone to facilitate separation of engineered refuse-derived fuel (ERDF) dewatered/dried feedstock (e.g., "fluff"); 6) a bag-house to capture micron size particulate, including, for example, features as may be required to meet local clean air or other requirements; and) an additional air filtration system, including, for example, features as may required by the local air quality requirements.

In operation, an example system with enhanced features for dewatering/drying a variety of organic feedstock may include, for example, the following operations/functions: 1) organic feedstock may be shredded to an appropriate size or sizes based on feedstock origin and moisture level; 2) pre-sorted organic feedstock appropriately sized and containing up to 60 wt. % of moisture (water or other fluids) by weight may enter pulverizer/horizontal hammermill 3) the pre-sorted feedstock may be exposed to an air conveyor; for example, an air blower or fan may be located external to the pulverizer/hammermill and may pull or push ambient (or, for example, preconditioned) high velocity air through the pulverizer/hammermill; 4) the pulverizer/hammermill may pulverize the pre-sorted feedstock, thereby increasing the surface area of the pre-sorted feedstock while high velocity air mixes with the pre-sorted feedstock, separate the moisture from the surface of the pre-sorted feedstock, and carry the dry (to predetermined level) air-conveyed feedstock and moisture on the smaller (less than 20 microns) particles from the hammermill; 5) specially designed pulverizer/hammermill exit screens configured to keep larger conglomerates longer (increasing residence time) as moisture and smaller particles exit the pulverizer/hammermill; and 6) the exiting feedstock may be conveyed (e.g., via high velocity air from the air conveyor; such conveyed feedstock also interchangeably referred to herein as "air conveyed feedstock") to a cyclone for separation of the air-conveyed feedstock, and the high velocity air may be filtered for particulates at a bag house; and 7) high velocity filtered air exiting from the bag house may undergo other filtering/cleanups as needed prior to release to ambient air. Output of the air-conveyed feedstock from drying and other processing may include production of engineered refuse-derived fuel (e.g., fluff), which, alternatively to being compressed and packaged, may be used to produce pellets or other inputs for (additional processing, such as pyrolysis, gasification (e.g., synthetic gas "syngas"), and/or combustion. The pyrolization process may also be used, for example, to produce biochar. The syngas process and/or biochar process, for example, may in turn be used in production of biocoal, biooil, advanced bioproducts, and synthetic natural gas, and/or may be used for combine cycle generation, soil amendment products, filtration products, activate carbon precursors, and/or activated carbon products.

Additional aspects of the systems, devices, and methods of the present disclosure may include a control system for managing and/or controlling, either electrically or pneumatically, the monitoring, operation, and/or interoperation of the various processing devices within a processing system. One example implementation of a control system in accordance with aspects of the present disclosure may include use of a matrix bus and various devices and processes connectable via machine to machine interfaces for receiving parameters, providing mechanisms/algorithms for adjusting parameters, otherwise providing monitoring devices of the system, and providing and controlling communications and performing functions to, from, by, and among the devices of the system. Among other things, control via such matrix bus may allow the control system to recognize data from the devices and processes, control overall operation of the system, determine whether each device/process is functioning properly, control operation of each device/process (e.g., speed up or slow down each device/process), input changes to operational parameters and/or other characteristics of operation, including for use in tailoring certain product outputs from the system, such as fuel characteristics, schedule and monitor maintenance and other routine operations, use video and IR thermography for various analytics for the system, monitor and control various electrically operated features, such as conveyors, gates, doors, and other electrically driven system components, enable override of various subsystem components, analyze moisture in the feedstock and other aspects of the processing, and assess the presence of and assist in monitoring and controlling hazardous materials.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure include devices, systems, methods of operation, and control systems for processing waste into usable products, such as fuel stock, soil additives, and usable byproducts.

An overview of example system components and processes in accordance with aspects of the present disclosure will now be described.

Figure 1:
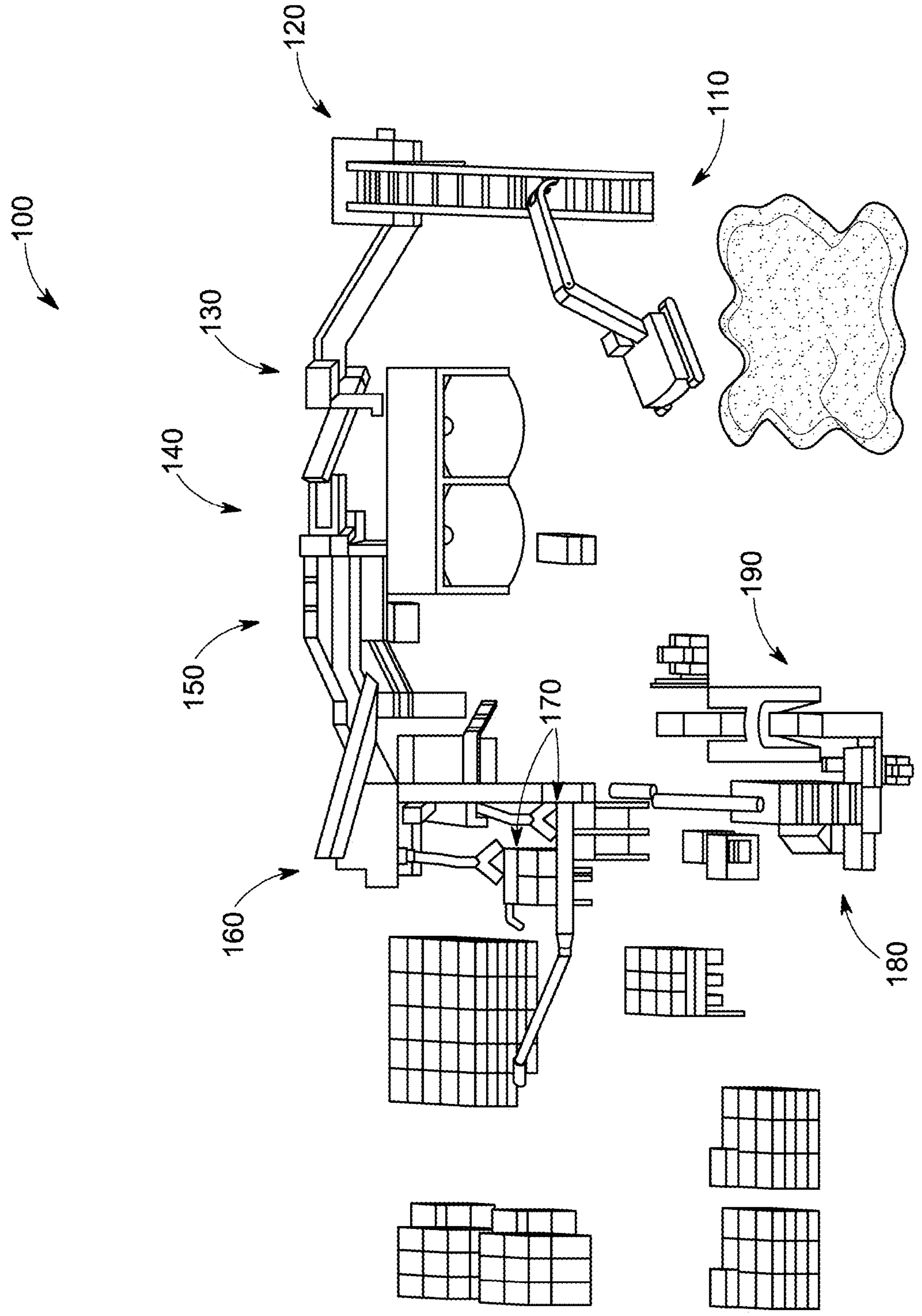
FIG. 1 shows various example system components in accordance with aspects of the present disclosure.

A first example of various system components in accordance with aspects of the present disclosure is shown in FIG. 1. In FIG. 1, a first portion 100 of such an example system may include one or more of: 1) a material loading area 110, which may arrive for example, on a tipping floor area; 2) a shredder 120; 3) a magnet based separator 130; 4) an eddy current separator 140; 5) additional sorting devices 150, such as a ballistic separator, an optical sorter to remove high value plastics, a finger slot (e.g., flats) separator, for example, and optionally a sorting observation area; 6) a mechanical separator 160, which may include or further include one or more horizontal hammermills and/or ringmills; 7) one or more material separation devices 170, such as one or more cyclones; 8) a compressor 180, such as one or more ram balers; and 9) a packager 190, such as one or more bale wrappers. In some aspects, the shredder 120, the magnet based separator 130, the eddy current separator 140, and the additional sorting devices 150 may be optional. In such aspects, the system may receive pre-sorted waste, non-recycled materials recovery facility (MRF) waste, biosolids, agricultural waste, paper pulp, green waste, digestate, and/or other types of biomass waste. The shredder 120 and/or related aspects thereof may interchangeably be referred to herein as a "pre-shredder".

Figure 2:
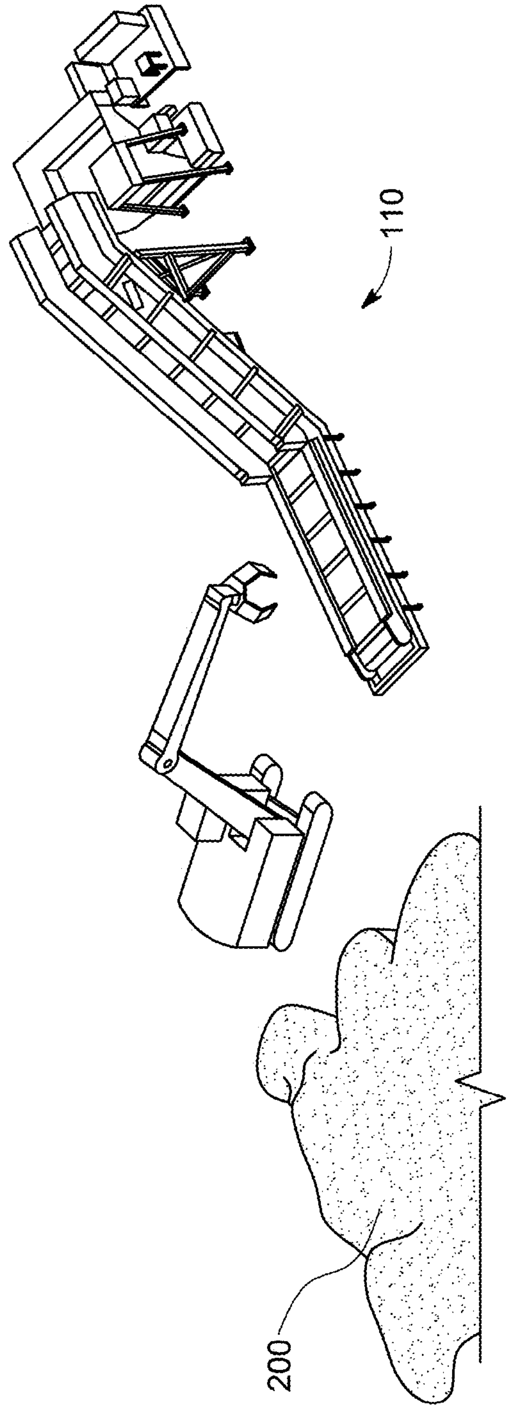
FIG. 2 shows a pictographic representative view of a portion of an example system and method that includes receipt of waste at a material loading area, in accordance with aspects of the present disclosure.

As shown in FIG. 2, the system and method may begin with receipt of waste 200 also interchangeably referred to herein as "feedstock," arriving at the material loading area 110, such as a tipping floor area, similar to a typical transfer station. Delivery of the waste 200 may occur via a payloader and/or grapple operator, for example. In some aspects, the waste 200 may include municipal solid waste (MSW). The waste may be scanned for hazardous and other unwanted materials and organized (e.g., sorted). In some aspects, the waste 200 may include pre-sorted waste, non-recycled materials recovery facility (MRF) waste, biosolids, agricultural waste, paper pulp, green waste, digestate, and/or other types of biomass waste.

Figure 3:
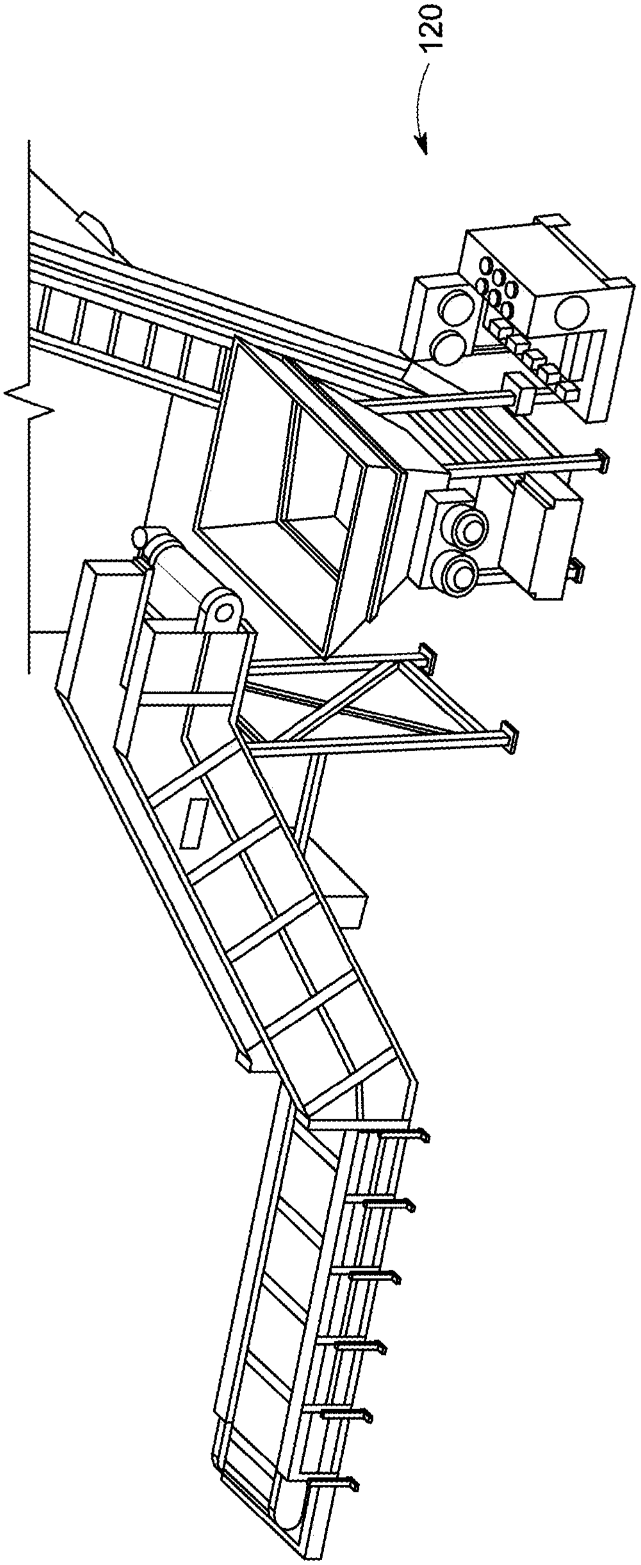
FIG. 3 shows a pictographic representative view of a portion of an example system and method that includes the feedstock being delivered to a shredder, in accordance with aspects of the present disclosure.

In some aspects, the feedstock may then be delivered to the shredder 120, as shown in FIG. 3, which may shred the feedstock into a generally uniform size. In some aspects, the shredded pieces may be about six inches in diameter or less.

An example shredder 120 may, for example, include a shear-type shredder made by American Pulverizer Company of St. Louis, Missouri. Such shredders may include, for example, cutter disks that counter-rotate to tear and shear waste materials and may include an electric drive or a hydraulic drive.

Figure 4:
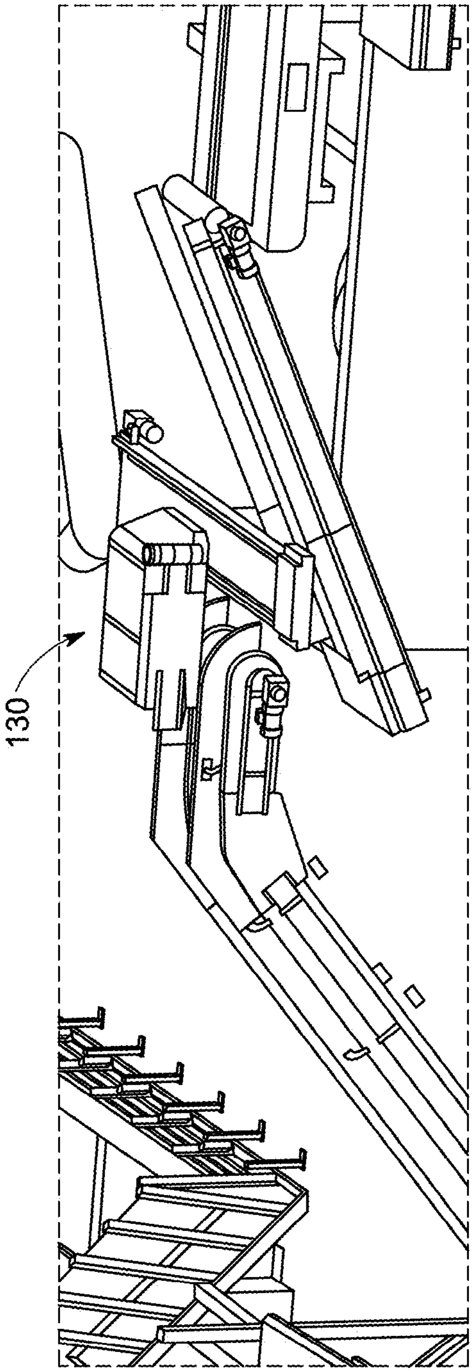
FIG. 4 shows a pictographic representative view of an initial processing portion of an example system and method that includes use of a magnet-based sorting device to assist in sorting magnetic materials from the feedstock, in accordance with aspects of the present disclosure.

In some aspects, the shredded feedstock is then mechanically conveyed (e.g., by feeder such as a hopper, a conveyer belt or other conveyor mechanism, or manually, for example, by shoveling) to an area for further initial processing. An example conveyer may be made by Hustler Conveyor of O'Fallon, Missouri. The initial processing may include, for example, use of the magnet-based sorting device 130, as shown in FIG. 4, to assist in sorting magnetic materials (e.g., ferrous materials) from the feedstock. An example magnet-based sorting device may include drum magnet technology produced by Dings, Co. of Milwaukee, Wisconsin.

Figure 5:
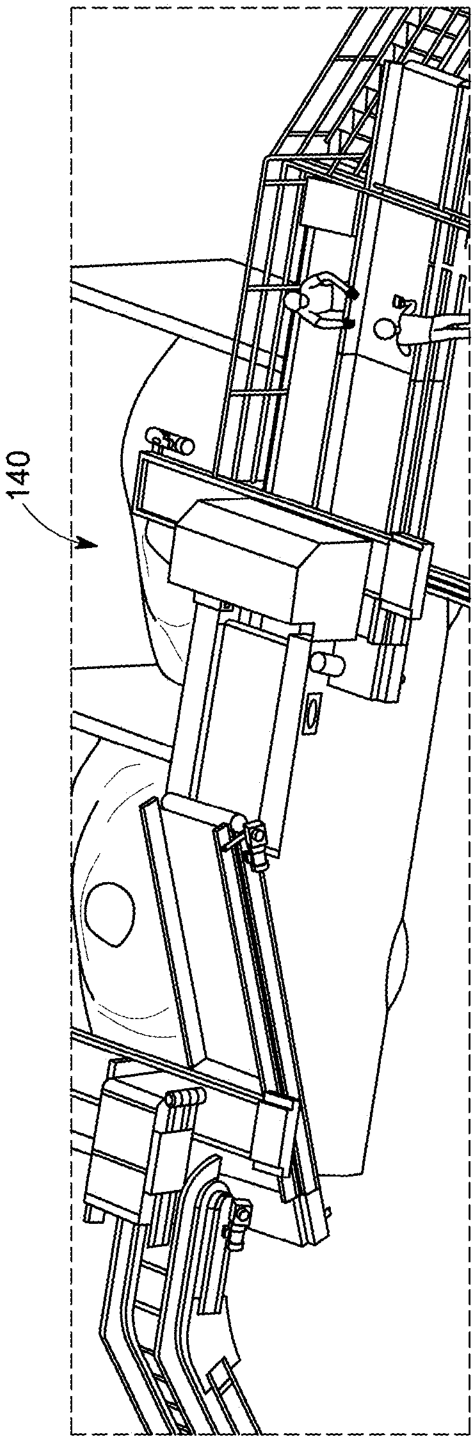
FIG. 5 shows a pictographic representative view of a processing portion of an example system and method that includes use of an eddy current type sorting device to separate non-ferrous metals from the feedstock, in accordance with aspects of the present disclosure.

Additional initial processing may include, for example, use of the eddy current type sorting device 140, as shown in FIG. 5, to separate non-ferrous metals from the feedstock. An example eddy current type sorting device may include an eccentric rotor eddy current separator made by Dings, Co. of Milwaukee, Wisconsin. Such a sorting device may include a magnetic rotor configured to spin at a higher speed than a conveyor belt associated with the magnetic rotor. Non-ferrous metals may be deflected further from the conveyor belt than non-magnetic materials, forming a first waste stream including the non-ferrous metals and a second, separate, waste stream including the non-magnetic materials.

Figure 6:
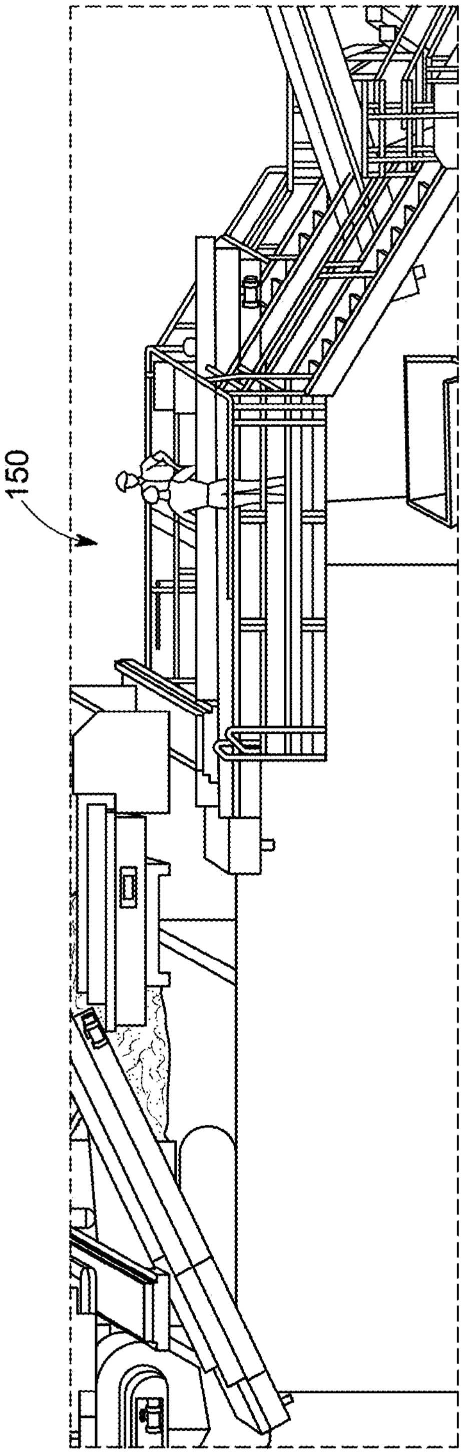
FIG. 6 shows a pictographic representative view of a processing portion of an example system and method that includes one or more sorting areas, such as one or more quality sort platforms, in accordance with aspects of the present disclosure.

Also included in the process may be the one or more sorting areas 150, such as one or more quality sort platforms, as shown in FIG. 6. Further initial processing may include use of a ballistic separator to separate, for example, two dimensional material from three dimensional material, as well as various fines from the feedstock. The fines may be separated, for example, using a screen or other fine separator. Such fines may proceed to the drying process at this time, as described further below.

In some aspects, the feeds of separated two dimensional and three dimensional material may then be deflected to an optical sorter where, for example through the use of software based devices high value plastics (e.g., number one and number two plastics) may be identified and separated from the feeds. In some aspects, the software may be configured to receive near-infrared spectroscopy data, for example, and determine material parameters based on the near-infrared spectroscopy data. Example material parameters may include caloric value, poly-vinyl-chloride content, and/or water content. In some aspects, the software may be configured to determine the material parameters based on the near-infrared spectroscopy by comparing the received near-infrared spectroscopy data to stored or otherwise existing near-infrared spectroscopy data, such as data stored in a materials database or other data repository. These plastics may be baled, sorted and sold to recycling companies, along with the separated ferrous and non-ferrous metals. In addition to separating the plastics from the feeds, any polyvinyl chloride (PVC) containing materials may also be separated. In one example implementation, a goal of 0.5 percent of PVC is sufficient.

Figure 7:
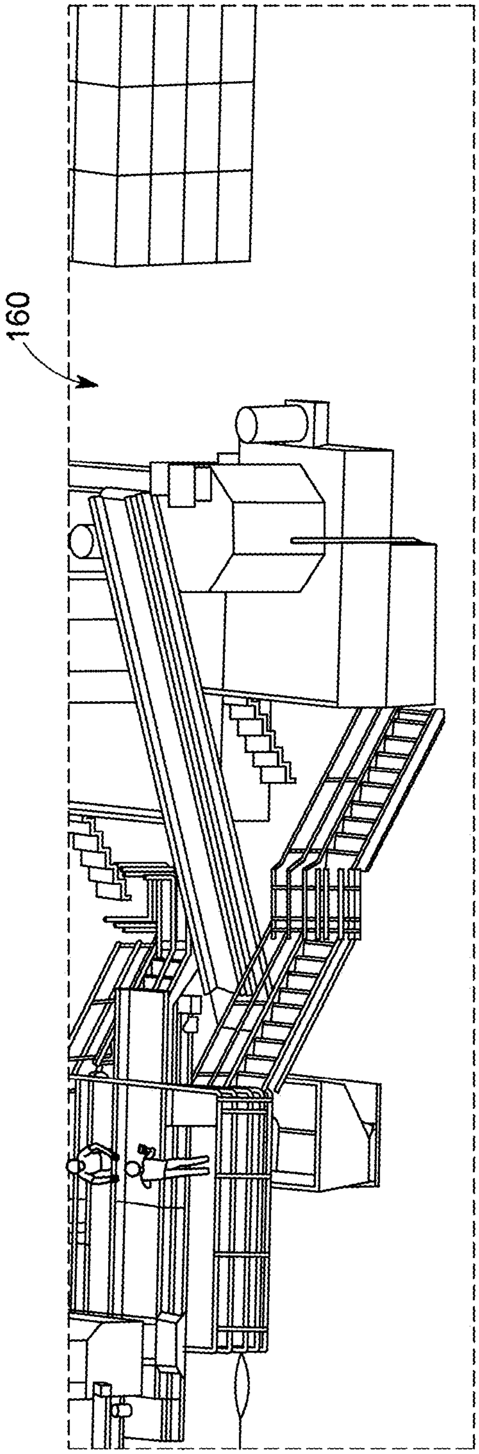
FIG. 7 shows a pictographic representative view of a processing portion of an example system and method that includes a first dryer and pulverizer, which may include or further include one or more horizontal hammermills, in accordance with aspects of the present disclosure.
Figure 9:
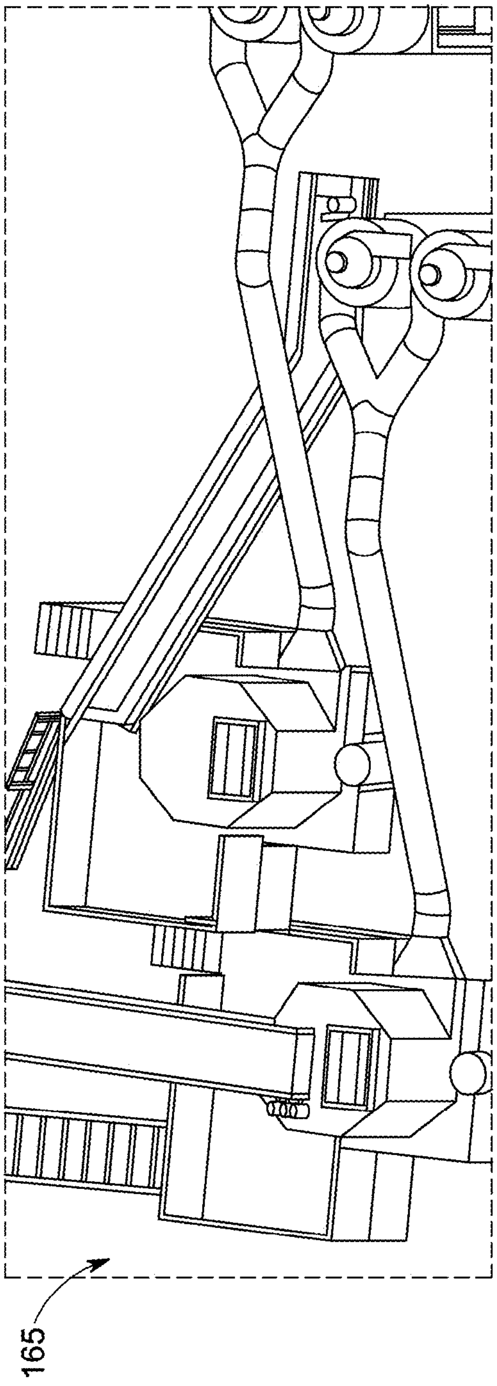
FIG. 9 shows a pictographic representative view of a processing portion of an example system and method that includes a second dryer and pulverizer, which may include or further include one or more horizontal hammermills, in accordance with aspects of the present disclosure.

The remaining materials in the pre-sorted feedstock may then proceed to a drying and pulverizing phase. Such drying and pulverizing may occur via mechanical processing, such using a first dryer and mechanical pulverizer 160 (FIG. 7) of one or more dryers and crusher/separator 165 as shown in FIGS. 7 and 9. In some aspects, components of the system (e.g., the air blower and/or the mechanical pulverizer 160) may produce about 1,000 cubic feet per minute (cfm) to about 50,000 cfm of air flow. In some aspects, components of the system (e.g., the air blower and/or the mechanical pulverizer 160) may produce at least 5,000 cfm of air flow. In some aspects, components of the system (e.g., the air blower and/or the mechanical pulverizer 160) may produce more than 50,000 cfm of air flow. In some aspects, the air blower may provide a majority of the air flow rates described above, and the mechanical pulverizer 160 may add to the air flow provided by the air blower. An example mechanical pulverizer 160 may include a ringmill, such as a ringmill made by American Pulverizer Company of St. Louis, Missouri. The ringmill may include a rotor coupled to one or more shafts. A plurality of rings may be rotatably coupled to each of the shafts. In some aspects, the rings may include a plurality of teeth. In other aspects, the rings may be smooth. During operation of the ringmill, rotation of the rings and shafts may pulverize the waste in the ringmill. Another example mechanical pulvrizer 160 may include a horizontal hammermill. The horizontal hammermill may include a rotor coupled to a plurality of hammers. As the rotor spins, the hammers swing outward, spinning rapidly to crush the material being processed. The horizontal hammermill may include a grate, mesh or screen. Crushed material smaller than openings in the grate, mesh, or screen may fall through the grate, mesh, or screen for further processing. Another example pulverizer 160 may include a Vertical Shaft Impactor (VSI), such as a VSI made by Sebright of Hopkins, Michigan. The VSI may include, for example, a hammermill type feature in a horizontal arrangement relative to the feed direction. The hammermill may include use of blunt metal blades, for example. Among other results of the VSI operation, for any type of material having a closed cell type structure, the VSI ruptures the cell structure. The VSI may pulverize the feed and produce an air flow from its operation. In one example implementation the VSI may produce about 18,000 cfm of air flow. The mechanical pulverizer 160 may also interchangeably be referred to herein as a ringmill, a horizontal hammermill, and/or a VSI.

Figure 8:
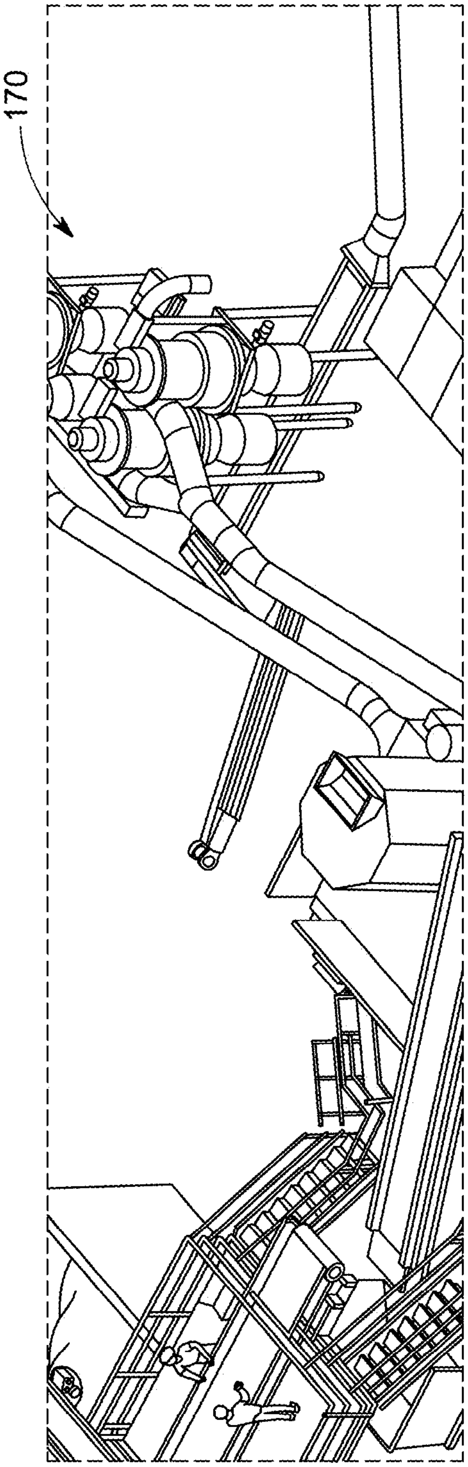
FIG. 8 shows a pictographic representative view of a processing portion of an example system and method that includes a first material separation device, in accordance with aspects of the present disclosure.
Figure 10:
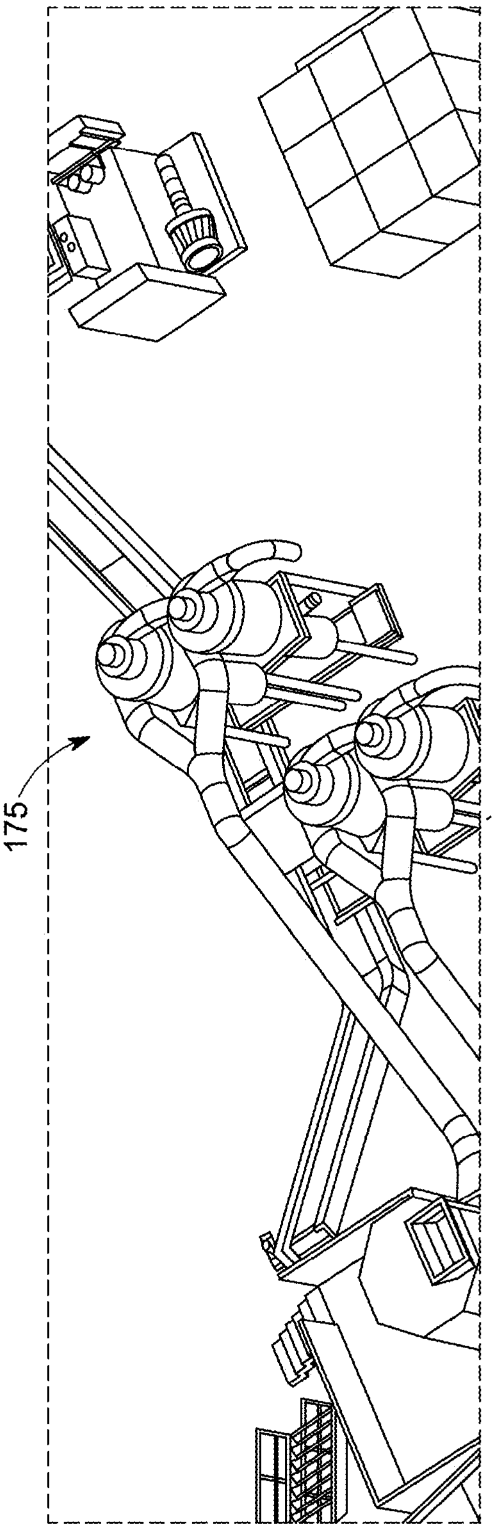
FIG. 10 shows a pictographic representative view of a processing portion of an example system and method that includes a second material separation device, in accordance with aspects of the present disclosure.

From the drying and pulverizing process, the air-conveyed feedstock may then proceed to a first material separation device (e.g., device 170 of FIG. 8) of one or more material separation devices 170, 175, as shown in FIGS. 8 and 10, such as cyclones. Various example cyclone components usable in accordance with aspects of the present disclosure may be made by Imperial Systems, Inc., of Jackson Center, Pennsylvania. The produced fugitive air flow may proceed to a baghouse for fines removal, and any heavier material in the airflow may collect below the airflow.

Water may be reclaimed from the feedstock during several of the processes described above. For example, water may be reclaimed from the mechanical pulverizers 160, 165 and/or the material separation devices 170, 175. The amount of reclaimed water may be significant and may also produce a useful product. It is noted that typical MSW may average about 43% water content. As moisture laden air exits the baghouse during processing by the pulverizer/dryer, water vapor in the air may be condensed into a water output stream. In one example implementation in accordance with aspects of the present disclosure, approximately 1200 gallons of water may be recaptured from processing about fourteen tons per hour of MSW. Such water output from municipal waste may be particularly valuable for processing in arid locations, where, for example, the water plus the bio-char soil amendment output may be used in large scale agricultural reclamation projects (e.g., reclaiming desert for agricultural uses). For example, recaptured water derived from biogenic feedstock may be reused, for example in agricultural applications. Recaptured water derived from other types of feedstock may be further analyzed and/or purified before reuse.

The feed of the air-conveyed feedstock may then proceed to a second dryer and pulverizer (e.g., dryer and pulverizer 165 of FIG. 9) for a second drying and final sizing process, followed by a second processing past cyclones (e.g., a second material separation device 175 of FIG. 10) to remove any leftover moisture in the feed. Fines may again be collected from the air flow at a baghouse. The leftover moisture may also be reclaimed as water after the air flow passes the baghouse. The second dryer and pulverizer 165 may interchangeably be referred to herein as a ringmill, a horizontal hammermill, and/or a VSI.

Figure 11:
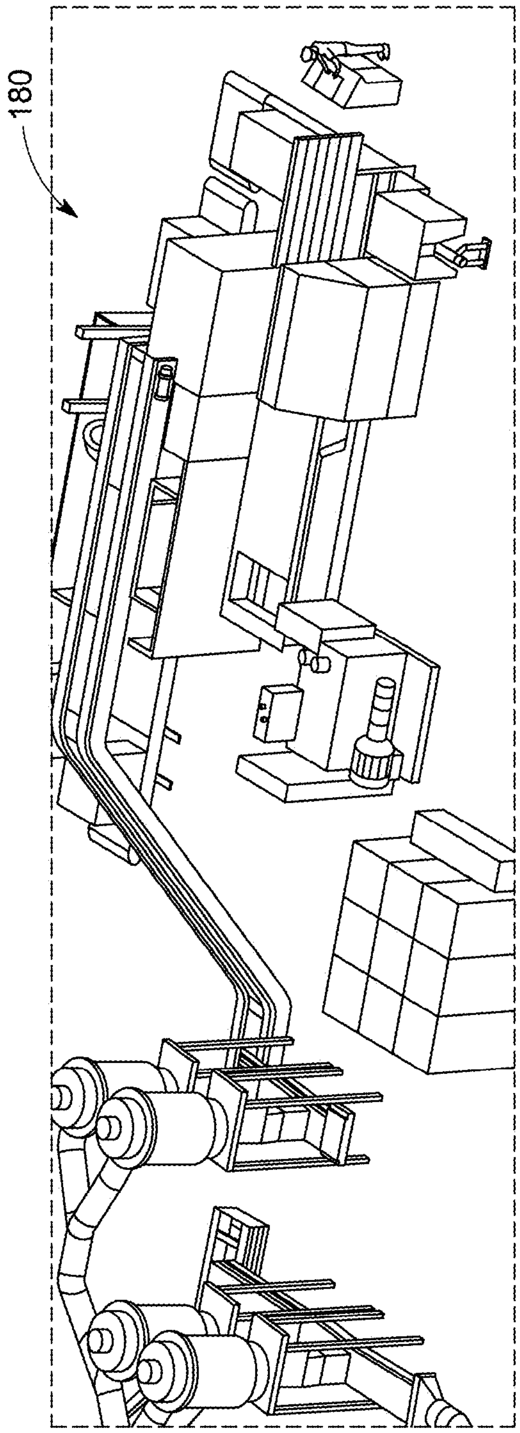
FIG. 11 shows a pictographic representative view of a processing portion of an example system and method that includes an example baler, in accordance with aspects of the present disclosure.
Figure 12:
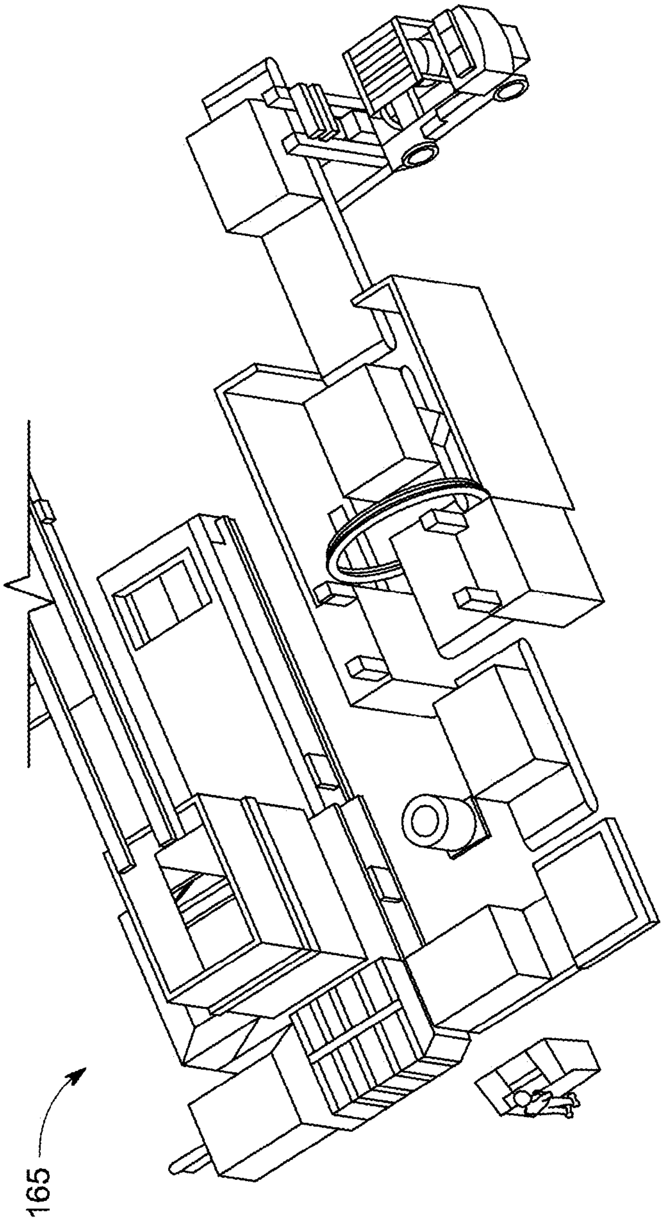
FIG. 12 shows a pictographic representative view of a processing portion of an example system and method that includes an example packager, in accordance with aspects of the present disclosure.

At this point in the processing, engineered refuse-derived fuel (ERDF) may be produced, which may now constitute dried MSW, which has the constituency of fluff. The ERDF ("fluff") may then optionally be baled (e.g., using example baler 180 as shown in FIG. 11) and cross-wrapped (e.g., using packager 190 as shown in FIG. 12) for use, for example, as fuel having higher British Thermal Unit (BTUs) per unit weight than standard MSW waste that has not been processed in accordance with the above described portions and a system and method in accordance with aspects of the present disclosure. An example baler usable in accordance with aspects of the present disclosure may be made by Maren Balers & Shredders of South Holland, IL.

Alternatively to being baled and cross-wrapped for shipping and/or later use, the fluff consistency ERDF may be further processed.

For example, in some aspects the fluff may be burned as fuel. In some aspects, the composition of the feedstock 200 may be controlled to produce fluff usable as fuel capable of generating a target amount of energy. For example, changing plastic content of the feedstock may change an amount of energy that may be produced by the fluff. For example, increasing an amount of plastic in the feedstock may increase an amount of energy that may be released when burning the fluff as fuel. In some aspects, heat released during combustion may be used to generate steam, which in turn may be used to create electricity.

In another example implementation, the fluff ERDF may next proceed to a gasifier to be used to produce "syngas". Syngas may be used as an input to various downstream processes configured to produce, for example, methanol, ethanol, diesel, gasoline, and so forth. The syngas may be further processed to generate high value products such as ethanol, jet fuel, diesel, gasoline, natural gas, and so forth.

Figure 13:
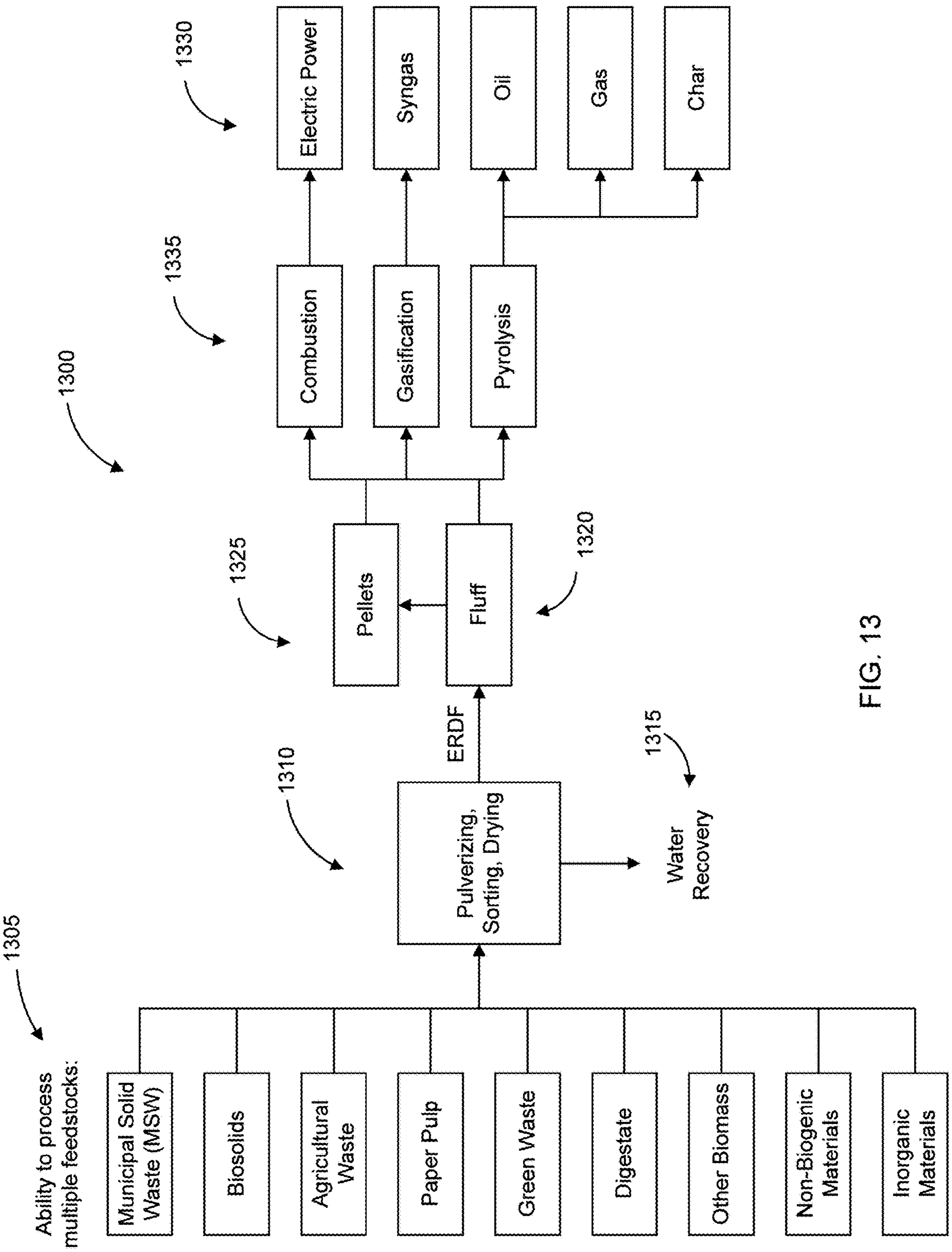
FIG. 13 contains a representative flow chart of various example components and/or functions of a system in accordance with aspects of the present disclosure.

FIG. 13 contains a representative flow chart of various example components and/or functions of a system in accordance with aspects of the present disclosure. As shown in FIG. 13, the flow 1300 may include processing of one or more feedstocks 1305 that may include, for example, municipal solid waste (MSW), biosolids, agricultural waste, paper pulp, green waste, digestate, other biomass materials, non-biogenic materials, and/or inorganic materials, as well as other materials. The feedstocks may be dried and otherwise processed 1310, such as by pulverizing, which, among other things, may result in production of water 1315 from the drying and other processing 1310.

Output of the feedstock from drying and other processing 1310 may include production of a fluff 1320, which may in turn be used to produce pellets 1325 or other output 1330, via additional processing methods 1335. Example processing methods may include combustion, gasification, and pyrolysis. Combustion may be used to produce electric power. Gasification may be used to produce syngas. Pyrolysis may be used to produce oil, gas, and/or char.

Figure 13A:
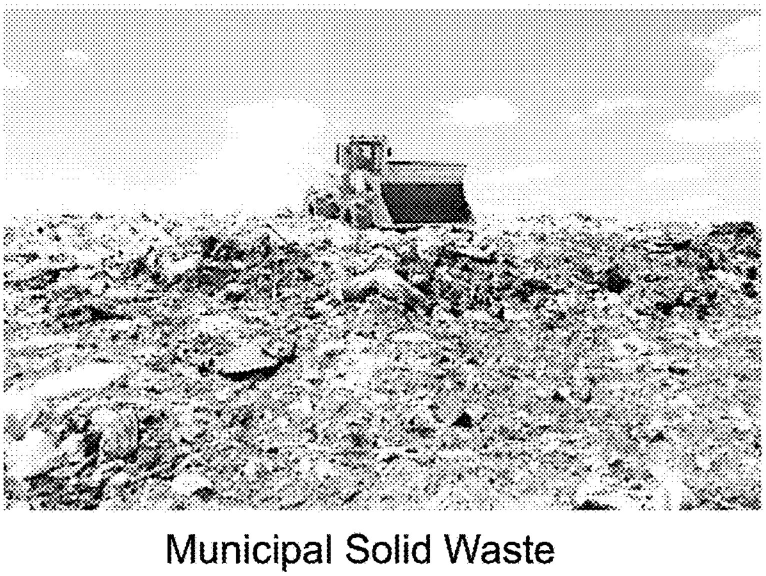
FIG. 13A shows a high level representative pictographic diagram of the MSW to fluff to clean coal product, in accordance with aspects of the present disclosure.
Figure 13A:
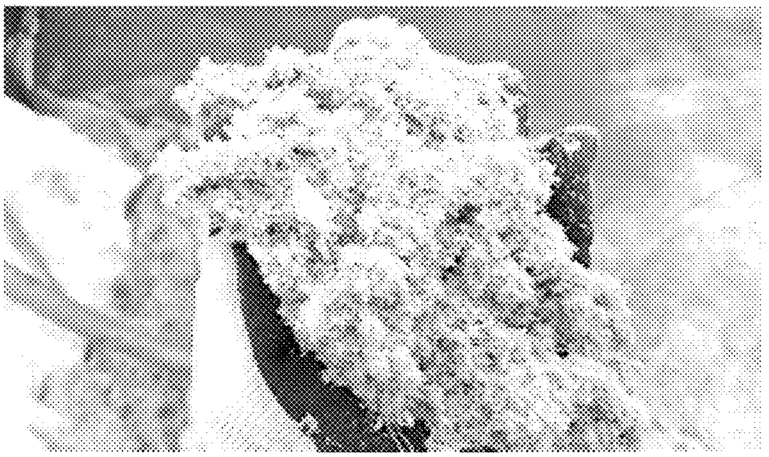
Figure 13A:
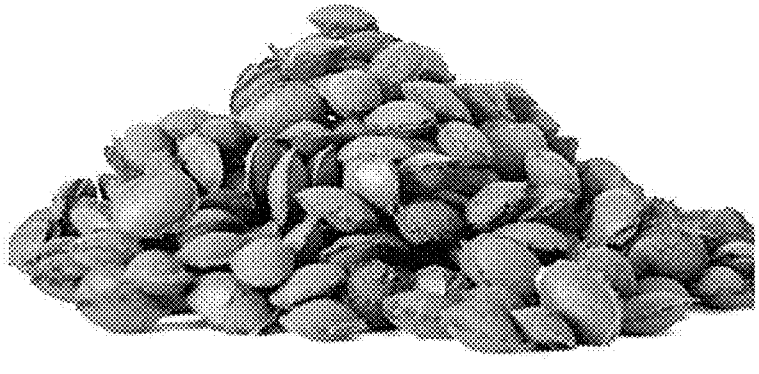

FIG. 13A shows a high level representative pictographic diagram of the MSW to fluff to clean coal (e.g., biocoal) product, in accordance with aspects of the present disclosure.

Figure 13B:
FIG. 13B shows a high level representative pictographic diagram of the MSW to fluff to syngas product, in accordance with aspects of the present disclosure.
Figure 13B:
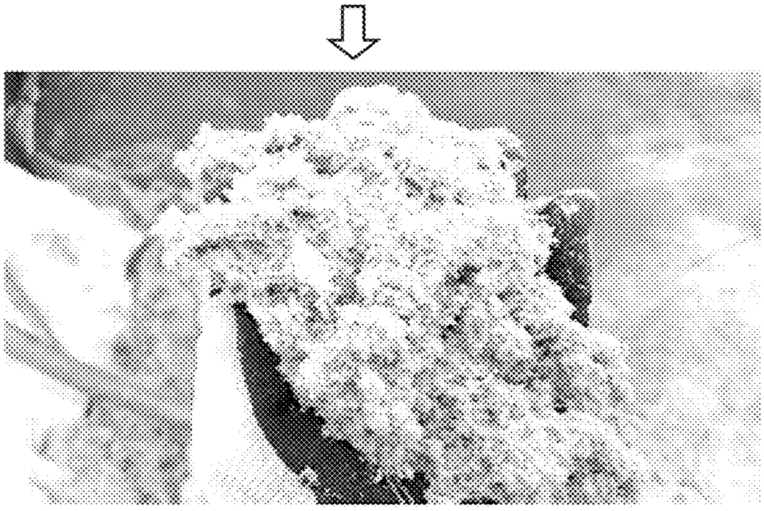
Figure 13B:
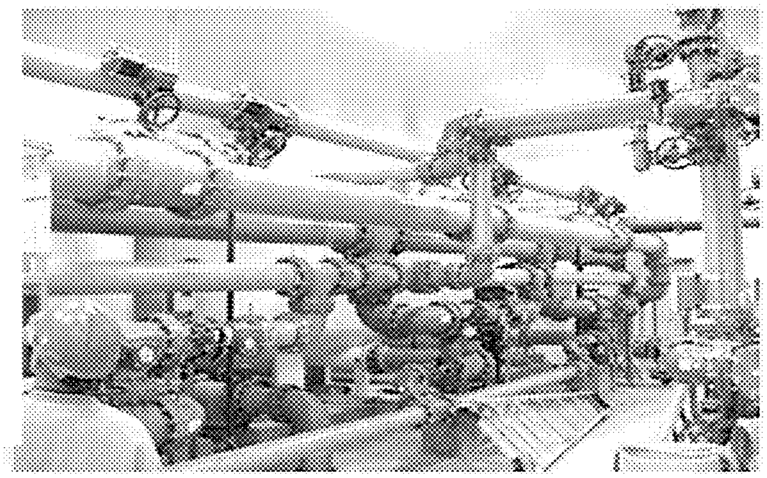

FIG. 13B shows a high level representative pictographic diagram of the MSW to fluff to syngas product, in accordance with aspects of the present disclosure.

Figure 14:
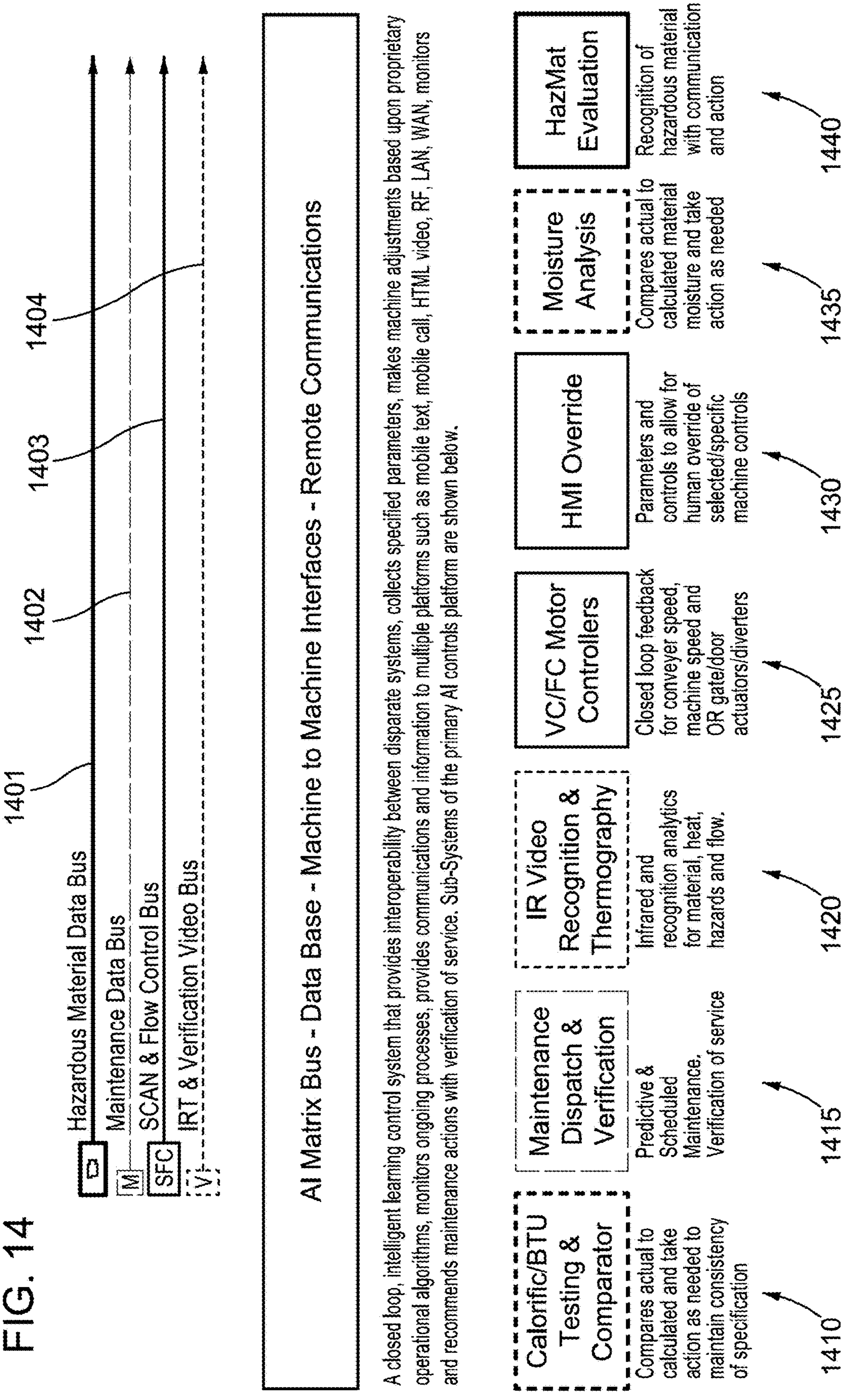
FIG. 14 show various devices and processes within an example control system, in accordance with aspects of the present disclosure.

Aspects of the present disclosure may include a control system for managing and/or controlling the monitoring, operation, and/or interoperation of the various processing devices within an overall MSW processing system, such as described above. Such control system may include various aspects and features as representatively shown in FIGS. 14-17. In FIG. 14, a matrix bus and various devices and processes connectable via machine to machine interfaces are shown for receiving parameters, providing mechanisms/algorithms for adjusting parameters, otherwise providing monitoring, and providing and controlling communications to, from, and among the devices of the system. Among other things, control via such matrix bus may allow the control system to recognize data from the devices and processes, control overall operation of the system, determine whether each device/process is functioning properly, control operation of each device/process (e.g., speed up or slow down each device/process), input changes to operational parameters and/or other characteristics of operation, schedule and monitor maintenance and other routine operations, use video and IR thermography for various analytics for the system, monitor and control various electrically operated features, such as conveyors, gates, doors, and other electrically driven system components, enable override of various subsystem components, analyze moisture in the feedstock and other aspects of the processing, and assess the presence of and assist in monitoring and controlling hazardous materials.

As shown in FIG. 14, the devices and processes within the control system may include, for example, a calorific/BTU testing and comparator function 1410, maintenance dispatch and verification function 1415, infrared (IR) video recognition and thermography function 1420, voltage control (VC)/frequency control (FC) motor controllers function 1425, human-machine interface (HMI) override function 1430, moisture analysis function 1435, and hazmat evaluation function 1440. Each of the above devices and processes may have its own control operations (e.g., for stand-alone control via an HMI console), for stand-alone operation, and also has one or more communications ports and/or communication interface features (e.g., an Ethernet connection for providing input/output communication with the device/process). Each of the above devices and processes may be actuated mechanically, electro-mechanically, hydraulically, or pneumatically, for example. However, the above devices and processes generally do not have the capability on their own to interoperate with one another. Thus, for example, to control overall operation in the absence of such interoperability, each device and/or process must be individually controlled so as to produce an overall system output.

As further shown in FIG. 14, in one example implementation, the bus may include several communication buses (also interchangeably referred to herein as "communication pathways" or "communication highways"), which may, for example, provide for communication regarding hazardous material data 1401, maintenance data 1402, scanning machine/process operation and flow control 1403, and IR thermography (IRT) and verification data 1404, such as video. The hazardous material data bus 1401 may provide information communications regarding the presence/handling of hazardous materials. For example, human video monitoring and/or automated video analysis may be used to identify the possible presence of hazardous material in the feedstock. The maintenance data bus 1402 may be used to communicate maintenance information, such as a maintenance activity for a particular machine being due. The scanning machine/process operation and flow control bus 1403 may provide a communication pathway for information regarding machine operation, for example. The IRT and verification video bus 1404 may, for example, provide video feed, such as video for monitoring a service technician's scheduled servicing of a machine. Such video may include, for example, either an existing machine/process monitoring video feed or a separately installed video monitoring device to the existing machine/process. In one example implementation, triggering of the video recordation for such a maintenance feed may occur, for example, by signaling via initiation of the maintenance operation (e.g., service technician signals maintenance operation begins, or maintenance operation is detected by technician activity).

As shown in FIG. 14, for the calorific/BTU testing and comparator function 1410, samples of processed feedstock may be taken, for example, at various points in the processing of the feedstock, to measure characteristics of the feedstock and consistency with processing expectations. For some machines/processes, such characteristics may be determinable via the standalone machine/process, and the comparator function 1410 may additionally serve as a check of that machine's/process' determination of the characteristic.

For the maintenance dispatch and verification function 1415, information on maintenance requirements may be stored and used to trigger maintenance functions and to verify proper completion. Additional features may include monitoring features, such as use of cameras to check machine operations or characteristics (e.g., IR cameras identifying excessive heat generation from machine parts that are in process of predicted failure).

For the IR video recognition and thermography function 1420, video and IR cameras are used to monitor various activities, machines, etc., to ensure proper operation/predict failure. Some aspects of the IR video recognition and thermography function 1420 may overlap with those in the maintenance dispatch and verification 1415.

For the voltage control (VC)/frequency control (FC) motor controller function 1425, various aspects of electrical operation may be monitored and controlled, such as to control machine operation and conveyor speed, opening and closing of gates, valves, and doors, and operation of various other devices, such as actuators and diverters.

For the HMI override function 1430, the control system and/or an operator may be provided with the capability to override the operations normally controlled via the HMI, for example.

For the moisture analysis function 1435, actual moisture levels may be collected (e.g., via sensors) and used for comparison to calculated/predicted moisture levels as may be important for product output quality control. For example, length of time for machine/process operation may be varied to control moisture at various points in the overall system operation. Sensed results may also require input of moisture to the feedstock if insufficient moisture is present.

For the HazMat evaluation function 1440, various sensors may be used to identify the presence of hazardous materials and to communicate and/or control response thereto. Such sensors may include, for example, video and/or IR cameras, chemical sensors, and radiation sensors.

Figures 15, 16, 17:
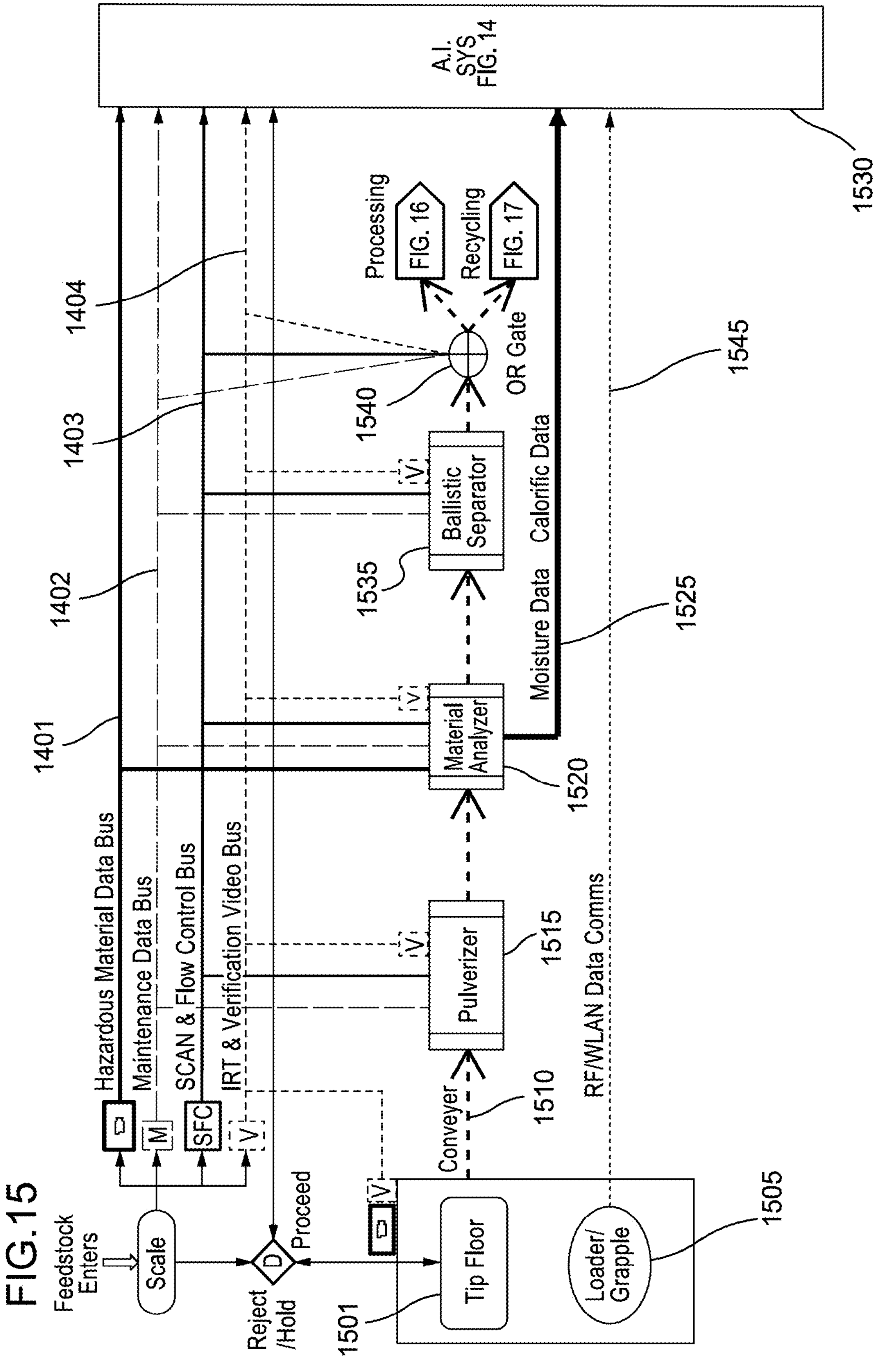
FIG. 15 shows a representative diagram of various components/subsystems and their various interactive operation for processing feedstock via the matrix bus of FIG. 14.
FIG. 16 shows additional components/subsystems for further processing feedstock in accordance with the representative diagram of FIG. 15.
FIG. 17 shows additional components/subsystems for further recycling feedstock in accordance with the representative diagram of FIG. 15.
Figure 16:
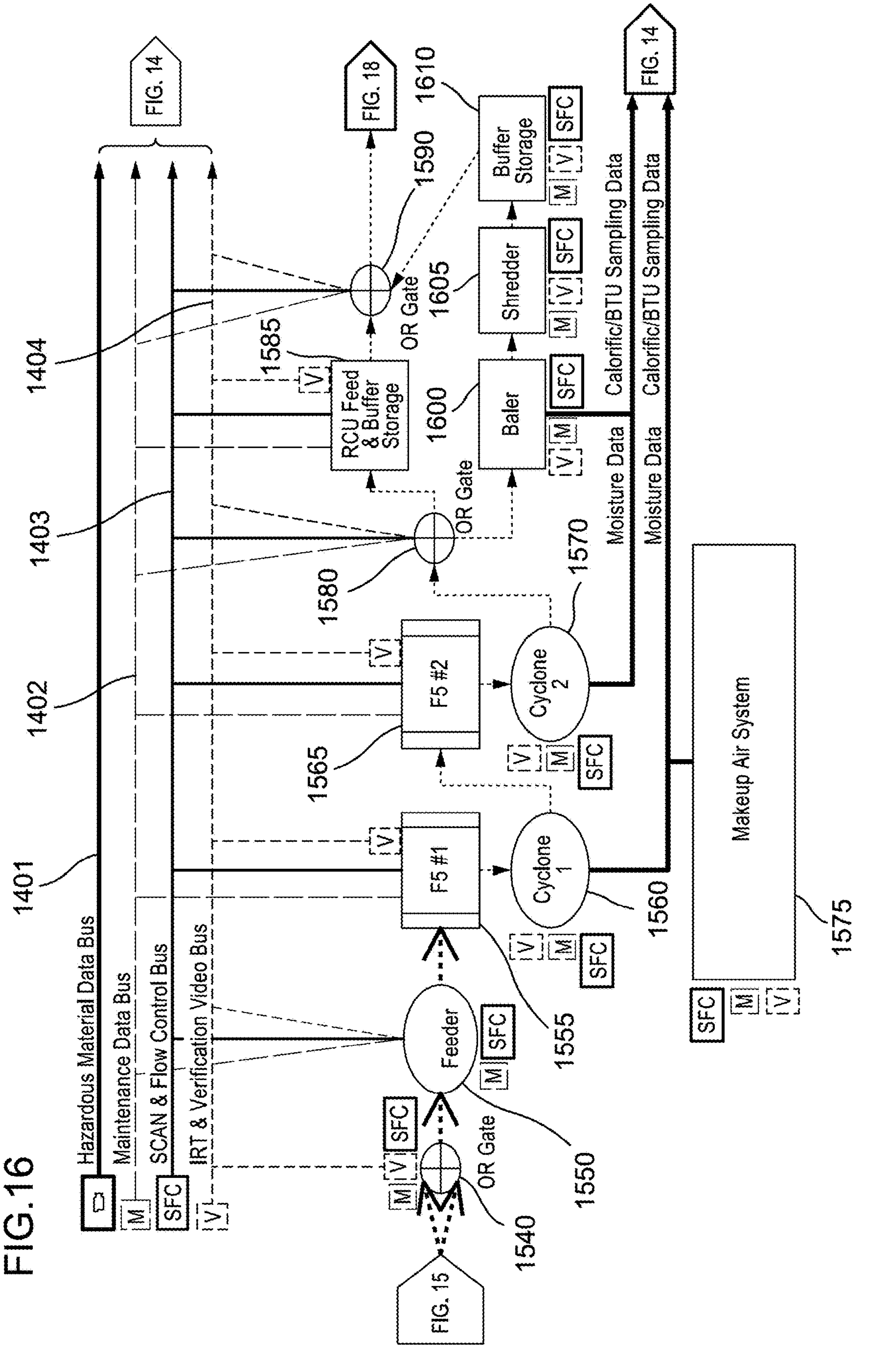
Figure 17:
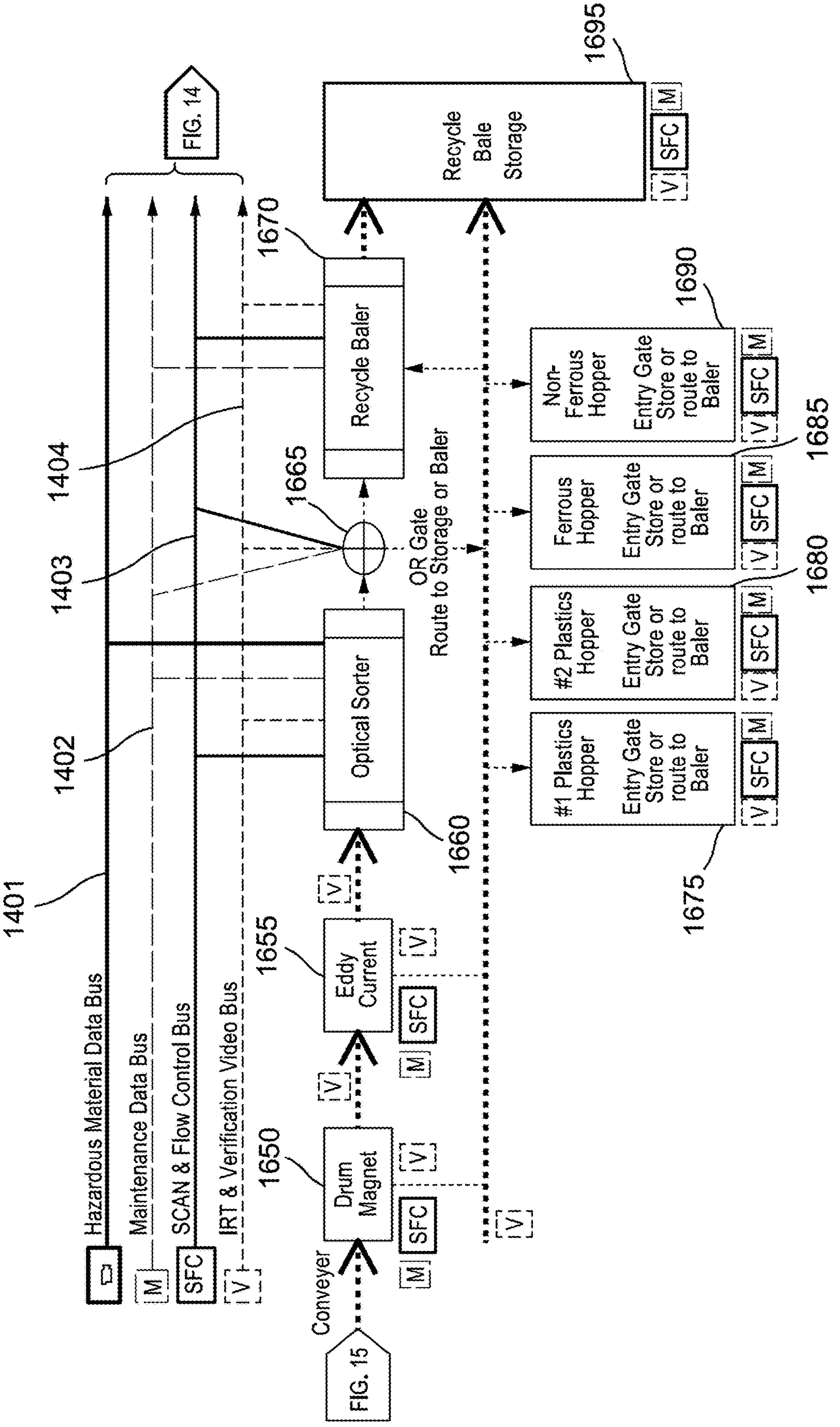

FIG. 15 shows a representative diagram of a first portion of various components/subsystems for a system and method for processing waste, as well as interactive operation of such components/subsystems, via the matrix bus of FIG. 14. As shown in representative fashion in FIG. 15, waste may enter the system at the tip floor 1501. At the tip floor 1501, communications and other functions regarding initial analyzing of the waste may occur via an IRT and verification video bus 1404, which may communicate a feed, for example, with one or more video and/or other inputs at this location, as well as the hazardous material data bus 1401. The waste may then be loaded/grappled 1505 to a conveyor system 1510 where it may proceed to a pulverizer 1515. After conveyance from the tip floor 1501 to the pulverizer 1515, the IRT and verification video bus 1404 may provide communications and other functions via one or more feeds with a video and/or other input at this location, for example. Communications and other functions may also occur between the pulverizer 1515 location and the maintenance data bus 1402 and the scan and flow control bus 1403.

The feedstock in FIG. 15 may then proceed to the material analyzer 1520, where communications and other functions may occur via all four bus lines 1401, 1402, 1403, 1404 (via the same or similar couplings as for the pulverizer 1515, as well as for hazardous material data). Communications and/or other functions relating to moisture and calorific data 1525 with respect to the material analyzer 1520 may also occur via coupling(s) with the system control module 1530.

The feedstock may then proceed to the ballistic separator 1535, for which, similar to the pulverizer area 1515, the IRT and verification video bus 1404 may provide communications and other functions feed with, for example, a video and/or other input, as well as with the maintenance data bus 1402 and the scan and flow control bus 1403.

As further shown in FIG. 15, processing may then proceed to one of further processing (to FIG. 16) or recycling (FIG. 17). For example, the conveyor 1510 may include multiple separate flows of feedstock, the flows relating to materials separated based on content. Decisional communications and other functions relating to the feedstock processing for the next action 1540 (e.g., a decision function as to which next step in processing is to be carried out), similar to as for the pulverizer 1515 and ballistic separator 1535, may include couplings with the IRT and verification video bus 1404, as well as with the maintenance data bus 1402 and the scan and flow control bus 1403.

As shown in FIG. 15, communications and other functions 1545 may also occur between the system control module 1530 and the loader/grapple 1505. For example, the system control module 1530 may provide communications and/or control as to the rate of loading to the conveyor 1510.

FIG. 16 shows a continuation of the processing flow of FIG. 15 from decision point 1540 for further processing of the feedstock for energy based and other use, such as in the form of ERDF, such as baled fluff or pellets. A feeder 1550, may deliver the pre-sorted feedstock to a first mechanical pulverizer 1555, such as a ringmill, a horizontal hammermill or a VSI, which, after processing and/or as part of processing, may include use of a dryer 1560, such as a cyclone. In some aspects, the feeder 1550 may include a drum feeder. Some or all of the pre-sorted feedstock may then proceed to a second mechanical pulverizer 1565 and/or a second dryer 1570. As further shown in FIG. 16, a feed of makeup air, such as air generated from a makeup air system 1575, may provide a source of air for use by dryers 1560, 1570. Each of the feeder 1550, the pulverizers 1555, 1565, the dryers 1560, 1570, and the makeup air system 1575 may be coupled to the maintenance data bus 1402, the scan and flow control bus 1403, and the IRT and verification video bus 1404.

Output ERDF after processing by the mechanical pulverizers 1555, 1565 and dryers 1560, 1570 may proceed to a next decision point 1580 for ERDF processing for the next processing activity. Such next processing activity may be or include, for example, processing by a thermal screw feed and buffer storage device 1585. This device 1585 may, for example, via decision point 1590 buffer and selectively feed the ERDF to further processing, such as via a thermal screw technology for compressible processing of the ERDF into pellets. An example thermal screw technology usable (or usable with modification) in accordance with aspects of the present disclosure includes thermal screw technology made by Therma-Flite of Benicia, California. Each of the decision point 1580, the thermal screw feed, the buffer storage device 1585, and the decision point 1590 may be coupled to the maintenance data bus 1402, the scan and flow control bus 1403, and the IRT and verification video bus 1404.

In FIG. 16, alternatively to proceeding to the thermal screw feed and buffer storage device 1585, the decision point 1580 may direct the ERDF to a baler 1600, shredder 1605, and buffer storage 1610. From the buffer storage, similar to as for output from the thermal screw feed and buffer storage device 1585, the decision point 1590 may selectively feed ERDF to a processor for further processing. Each of the baler 1600, the shredder 1605, and the buffer storage 1610 may be coupled to the maintenance data bus 1402, the scan and flow control bus 1403, and the IRT and verification video bus 1404.

FIG. 17 shows a continuation of the processing flow of FIG. 15 from decision point 1540 for further processing of the separations delivery for recycling and/or storage in baled form. As shown in FIG. 17, the feedstock may first proceed to a magnetic separator 1650, such as drum magnet technology, to separate magnetic materials from the feedstock, and the separated magnetic material may selectively be redirected to a ferrous hopper 1685, for example. From the magnetic separator 1650, the remaining feedstock may proceed to a non-magnetic metal separator 1655, such as an eddy current generator to separate non-ferrous metals, for example, from the feedstock, and the separated non-magnetic material may selectively be redirected to a non-ferrous hopper 1690, for example.

From the non-magnetic metal separator 1655, the remaining feedstock may proceed to an optical sorter 1660 to sort optical material from the feedstock. The optical sorter 1660 may use, for example, air knife technology to separate identified materials, such as certain plastics, and separate those materials from the feedstock. From the optical sorter, the feedstock may proceed to a decision point 1665, from which material flow may be directed either to the hoppers 1675, 1680, 1685, 1690, as appropriate, or continue on to a recycling baler 1670. Any remaining separated plastics, ferrous metals, and non-ferrous material may be routed to respective hoppers 1675, 1680, 1685, 1690 for storage or later routing to balers (e.g., baler 1670), for example, for sale, transfer, or further processing. The recycling baler 1670 may also selectively receive materials from one or more of the hoppers 1675, 1680, 1685, 1690. The materials from the baler 1670 and the respective hoppers 1675, 1680, 1685, and 1690 may also proceed to recycle bale storage 1695. Each of the magnetic separator 1650, the non-magnetic separator 1655, and the optical sorter 1660, as well as each of the plastic hoppers 1675, 1680, the ferrous hopper 1685, and the non-ferrous hopper 1690 may be coupled to the maintenance data bus 1402, the scan and flow control bus 1403, and the IRT and verification video bus 1404.

Figure 20:
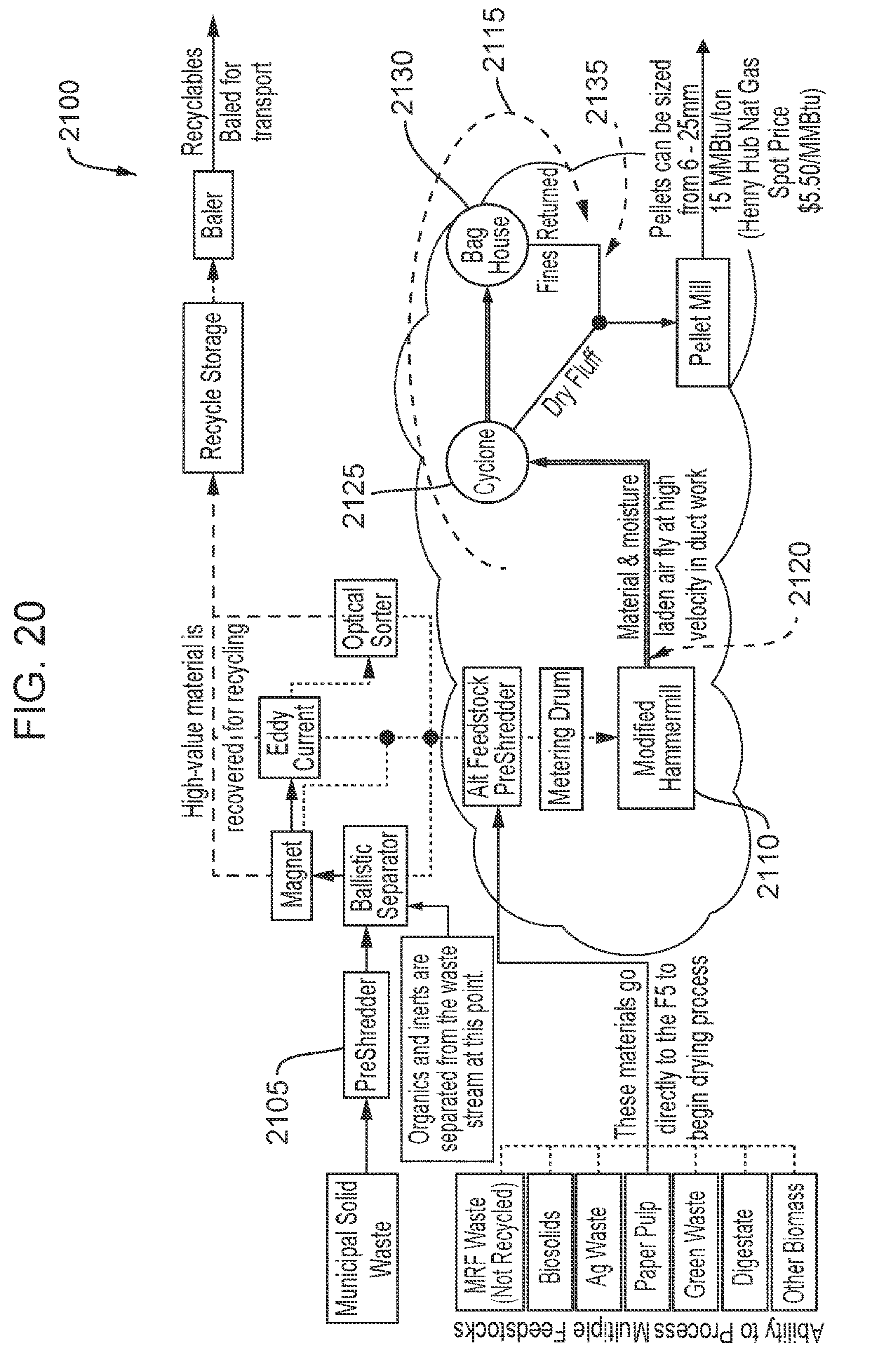
FIGS. 20-22 show representative aspects of various enhanced features for dewatering/drying a variety of organic feedstock for another example implementation in accordance with aspects of the present disclosure.
Figure 21:
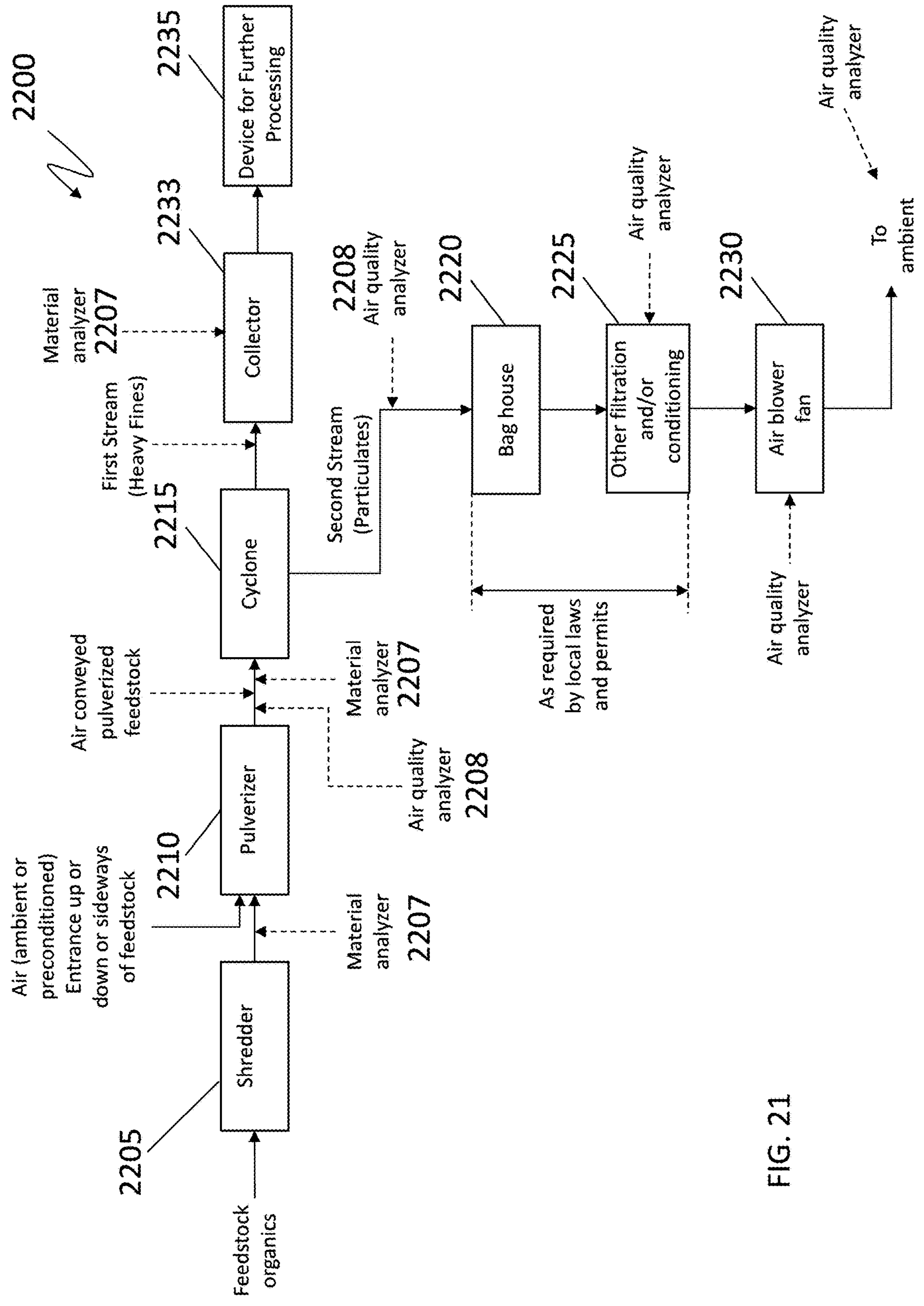
Figure 22:
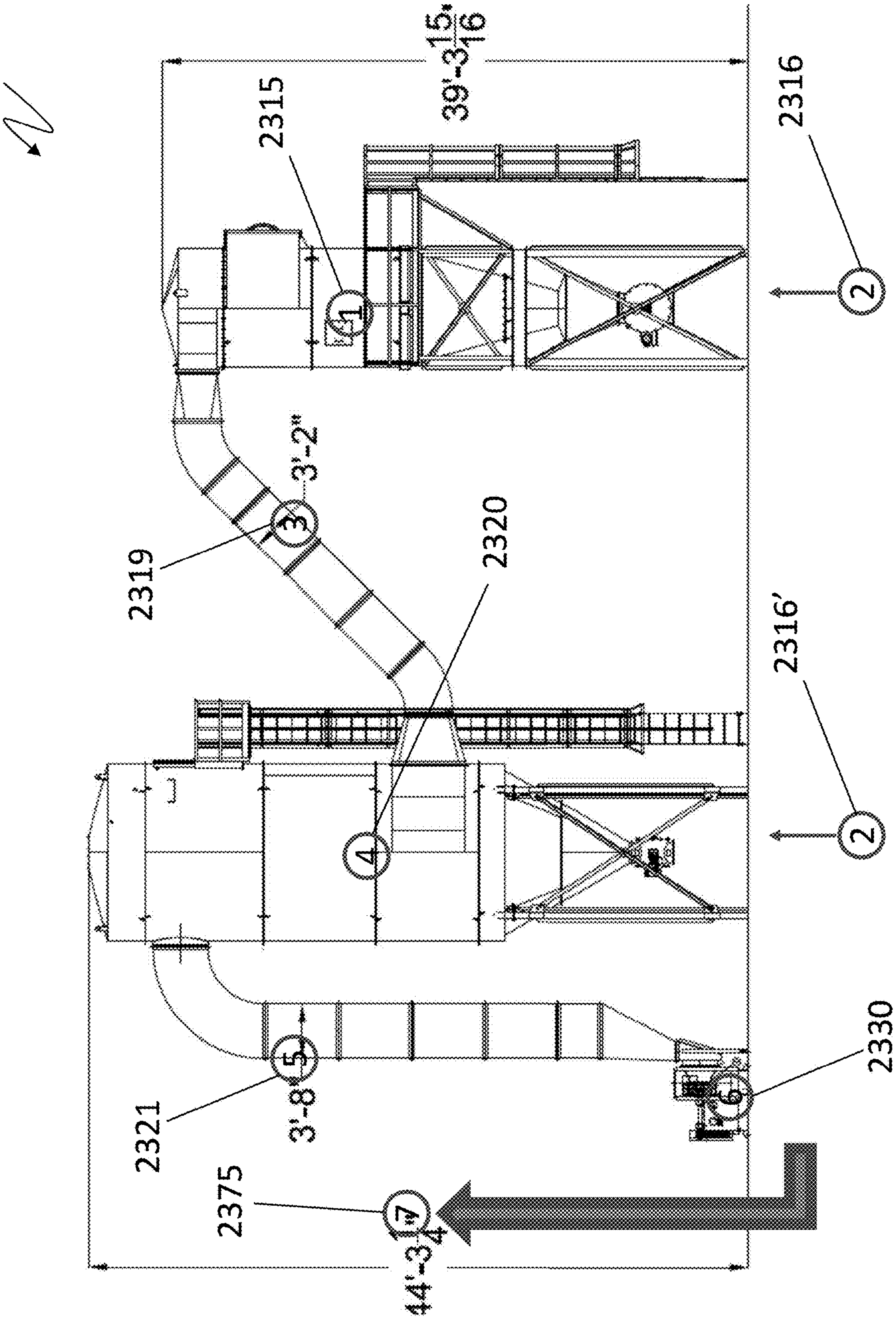

FIGS. 20-22 show representative aspects of various enhanced features for dewatering/drying a variety of organic feedstock for another example implementation in accordance with aspects of the present disclosure. In the implementation illustrated in FIGS. 20-22, the system 2100 may receive pre-sorted waste, non-recycled materials recovery facility (MRF) waste, biosolids, agricultural waste, paper pulp, green waste, digetate, and/or other types of biomass waste as pre-sorted feedstock. In some aspects, the pre-sorted waste may be or include organic material, inorganic material, or a mixture or organic and inorganic material. In some aspects, the pre-sorted waste may include wet sand. In some aspects, the feedstock may include a target and/or estimated value or range of values of calorific content. For example, in some aspects, the feedstock may have a caloric content from about 4,000 British Thermal Units per pound (BTU/lb) to about 30,000 BTU/lb. In some aspects, the feedstock may have a caloric content from about 7,000 BTU/lb to about 32,000 BTU/lb.

In some aspects, the feedstock may include multiple components. In some aspects, the feedstock may include a single component. In some aspects, the feedstock may include a predetermined moisture content. For example, in some aspects, the feedstock entering the pulverizer may contain up to 60 wt. % moisture. In some aspects, one or more characteristics of the feedstock may be determined (e.g., by a sensor, a material analyzer such as the material analyzer 2207, and so forth). Example characteristics may include a moisture content and/or a calorific content of the feedstock.

In aspects in which the characteristic is a moisture content of the feedstock, the computer system 1900 may be configured to receive information indicative of the moisture content of the feedstock (e.g., from a sensor, a material analyzer such as the material analyzer 2207, and so forth). The computer system 1900 may be configured to compare the received information indicative of the moisture content of the feedstock to a target value or range of values. The computer system 1900 may be configured to change one or more of an operation of the air conveyor 2115 and a device configured to transport material from the shredder 2105 (e.g., a conveyor belt, a metering drum), to the mechanical pulverizer 2110 based on the comparison. For example, in response to determining that the moisture content of the feedstock is above the target threshold, the computer system 1900 may increase the air velocity generated by the air conveyor 2115 and/or reduce a speed of the device configured to transport material from the shredder 2105 to the mechanical pulverizer 2110. In response to determining that the moisture content of the feedstock is below the target threshold, the computer system 1900 may decrease the air velocity generated by the air conveyor 2115 and/or increase a speed of the device configured to transport material from the shredder 2105 to the mechanical pulverizer 2110.

In aspects in which the characteristic is a calorific content of the feedstock, the computer system 1900 may be configured to receive information indicative of the calorific content of the feedstock (e.g., from a sensor, a material analyzer such as the material analyzer 2207, and so forth). The computer system 1900 may be configured to compare the received information indicative of the calorific content of the feedstock to a target value or range of values. The computer system 1900 may be configured to change or notify an operator to change a composition of the feedstock entering the shredder 2105 in response to the comparison. For example, in response to determining that the calorific content of the material feedstock is above the target threshold, the computer system 1900 may increase or command an operator to increase an amount of organics in the feedstock entering the shredder 2105. In response to determining that the calorific content of feedstock is below the target threshold, the computer system 1900 may increase or command an operator to increase an amount of one or more of plastic, paper, agricultural waste, wood, and/or automotive shredder residue to the feedstock entering the shredder 2105.

As shown in FIG. 20, the system 2100 may include and/or consist of one or more of the following: a shredder 2105, a mechanical pulverizer 2110, an air conveyor (interchangeably referred to herein as a blower or a fan) 2115, screens 2120, a fines separator 2125, a fines collector 2130, and an additional air filtration system 2135.

The shredder 2105 may be similar to the shredder 120, shown and described with regard to FIG. 3. The shredder 2105 and/or related features thereof may interchangeably be referred to herein as a "pre-shredder". The pre-sorted feedstock travels to the pulverizer via conveyor belt, a metering drum, and so forth. The shredder 2105 may be configured to reduce an initial component size of the pre-sorted feedstock into a selected pre-sorted feedstock subcomponent size before the pre-sorted feedstock is delivered to the mechanical pulverizer 2110.

The mechanical pulverizer 2110 may be a ringmill, a horizontal hammermill, or a vertical shaft impactor (VSI). In some aspects, the mechanical pulverizer 2110 may be similar to the pulverizer 160 shown and described with regard to FIG. 7. The mechanical pulverizer may include certain other optional features as shown and described with regard to FIGS. 9-10.

The an air conveyor, shown by representative arrow 2115, may be as a variable or relatively constant velocity air blower and/or include other features that pull high velocity air through the system 2100, and/or other air filtration components (e.g., part of system 2100) as may be required by local regulations, for example). In some aspects, the air conveyor 2115 may generate air velocities between about 1000-24,000 feet/minute (ft/min). In some aspects, the air conveyor may generate air velocities between about 1800-18,000 ft/min. Various features and details relating to an example air blower and/or other features that may also be usable with this component 2115 are also shown and described with regard to the air conveyor 2330 FIG. 22. The air conveyor 2115 may be located downstream of the mechanical pulverizer 2110, the screens 2120, the fines separator 2125, the fines collector 2130, and/or the additional air filtration system 2135.

In some aspects, the air conveyer 2115 may be configured to convey an air flow into an air inlet in mechanical pulverizer 2110 and draw the air flow through an air outlet in the mechanical pulverizer 2110 and into the fines separator 2125. In some aspects, the air conveyor 2115 may be positioned downstream of the mechanical pulverizer 2110 and configured to generate a suction force configured to pull air-conveyed feedstock through the mechanical pulverizer 2110 and other elements of the system 2100. The air-conveyed feedstock that exits the mechanical pulverizer 2110 is dry enough to be transported by airflow generated by the air conveyor 2115 and is not transported by a mechanical method.

The screens 2120 may be coupled to an outlet of the mechanical pulverizer 2110. The size of the openings in the screens 2120 may be dimensioned to control size of the air-conveyed feedstock exiting the mechanical pulverizer 2110 and to facilitate residence time of the pre-sorted feedstock in the pulverizer 2110. For example, pre-sorted feedstock particles too large (and/or that have too much moisture content) to fit though the screens 2120 may continue to be processed by the mechanical pulverizer 2110 until the pulverized pre-sorted feedstock is small enough to pass through the screens and dry enough to be conveyed by air. In some aspects, an area of the openings of the screens 2120 may range between approximately 0.0031 square inches ($in^2$)—approximately 16 $in^2$, for example. In some aspects, an area of the openings of the screens 2120 may be greater than or equal to approximately 0.0031 $in^2$, for example. In some aspects, an area of the openings of the screens 2120 may be less than or equal to 16 $in^2$, for example. In some aspects, the openings of the screens 2120 may have square or circular cross-sectional shapes. In some aspects, the openings of the screens 2120 may have cross-sections having different or varying geometric shapes.

The pre-sorted feedstock entering the mechanical pulverizer 2110 cannot be conveyed via air (e.g., such as an airflow generated by the air conveyor 2115), typically because the pre-sorted feedstock includes too much moisture content. The mechanical pulverizer 2110, the air conveyor 2115, and the screens 2120 are configured to, among other things, dry/dewater the pre-sorted feedstock so that the dried/dewatered pre-sorted feedstock can be conveyed by the airflow generated by the air conveyor 2115 (e.g., as air-conveyed feedstock). The pre-sorted feedstock entering the mechanical pulverizer 2110 has a first moisture content and the air-conveyed feedstock has a second moisture content that is lower than the first moisture content. For example, the material (e.g., pre-sorted feedstock) entering the mechanical pulverizer 2110 may have a moisture content of about 20 to about 60 wt. %. In some aspects, the air-conveyed feedstock leaving the mechanical pulverizer 2110 may have a moisture content of about 5 to about 35 wt. %. In some aspects, the air-conveyed feedstock leaving mechanical pulverizer 2110 may have a moisture content of at most 35 wt. %. In some aspects, the air-conveyed feedstock leaving mechanical pulverizer 2110 may have a moisture content of at most 20 wt. %. In some aspects, the air-conveyed feedstock leaving the mechanical pulverizer 2110 may have a moisture content of at most 15 wt. %. In some aspects, the air-conveyed feedstock leaving the mechanical pulverizer may include heavy fines, particulates, and/or moisture.

During mechanical pulverization, many fine particles are created, which may also interchangeably be referred to herein as particulates. In some aspects, the particulates may be or include micron or sub-micron-sized particles. In some aspects, the particulates may be 20 μm or smaller. In some aspects, the particulates may be 10 μm or smaller or smaller. In some aspects, the particulates may be 2.5 μm or smaller. These fine particles serve as nucleation sites for binding moisture released from the pre-sorted feedstock, such as may occur during pulverization by the mechanical pulverizer 2110. These nucleated waste particles typically pass through the screens 2120 after a short residence time (relative to the larger pieces of pre-sorted feedstock), drying the bulk waste by binding to water molecules and passing out of the mechanical pulverizer 2110 quickly relative to the larger pieces of pre-sorted feedstock. Advantageously, in very cold air that is less likely to carry moisture, the mechanical pulverizer 2110 saturates the air with these fine particles such that the air becomes supersaturated with fine particle nucleation sites, which bind moisture released from the pre-sorted feedstock as it is pulverized. It is therefore possible to dry the pre-sorted feedstock in the mechanical pulverizer 2110 enough for the pulverized pre-sorted feedstock to be air-conveyed at temperatures between about −20° F. to about 100° F. It is therefore possible to dry the pre-sorted feedstock via the mechanical pulverizer 2110 enough for the pulverized pre-sorted feedstock to be able to be air-conveyed at ambient air having a humidity ranging from about 0% to about 100%.

The fines separator 2125 may be configured to facilitate separation of dewatered/dried air-conveyed feedstock by particle size.

In some aspects, the fines separator 2125 may include a cyclone and/or a plurality of screens or other selective filtering mechanisms having differing or varied sizes of openings. The fines separator 2125 may be configured to separate the stream of dried/dewatered air-conveyed feedstock into a first stream and a second stream based on a size, a density, and/or a weight threshold. The first stream may include larger, denser, and/or heavier particles, including heavy fines such as fluff and conglomerate. In some aspects, one or more characteristics of the material from the first stream may be determined. Example characteristics may include a moisture content and/or a calorific content of the material from the first stream.

In aspects in which the characteristic is a moisture content of the material from the first stream, the computer system 1900 may be configured to receive information indicative of the moisture content of the material from the first stream (e.g., from a sensor, a material analyzer such as the material analyzer 2207, and so forth). The computer system 1900 may be configured to compare the received information indicative of the moisture content of the material from the first stream to a target value or range of values. The computer system 1900 may be configured to cause or notify/produce a signal for change of one or more of an operation of the air conveyor and a device configured to transport material from the shredder 2105 (e.g., a conveyor belt, a metering drum), to the mechanical pulverizer 2110 based on the comparison. For example, in response to determining that the moisture content of the material from the first stream is above the target threshold, the computer system 1900 may increase the air velocity generated by the air conveyor 2115 and/or reduce a speed of the device configured to transport material from the shredder 2105 to the mechanical pulverizer 2110. In response to determining that the moisture content of the material from the first stream is below the target threshold, the computer system 1900 may decrease the air velocity generated by the air conveyor 2115 and/or increase a speed of the device configured to transport material from the shredder 2105 to the mechanical pulverizer 2110.

In aspects in which the characteristic is a calorific content of the material from the first stream, the computer system 1900 may be configured to receive information indicative of the calorific content of the material from the first stream (e.g., from a sensor, a material analyzer such as the material analyzer 2207, and so forth). The computer system 1900 may be configured to compare the received information indicative of the calorific content of the material from the first stream to a target value or range of values. The computer system 1900 may be configured to change or notify/produce a signal for an operator or automated or other feature to change a composition of the feedstock entering the shredder 2105 based on the comparison. For example, in response to determining that the calorific content of the material from the first stream is above the target threshold, the computer system 1900 may increase or command an operator to increase an amount of organics in the feedstock entering the shredder 2105. In response to determining that the calorific content of the material from the first stream is below the target threshold, the computer system 1900 may increase or command an operator to increase an amount of one or more of plastic, paper, agricultural waste, wood, and automotive shredder residue to the feedstock entering the shredder 2105.

In some aspects, the material in the first stream may be directed to a device for further processing 2135, such as a pellet mill, a gasifier, a pyrolizer, and so forth. In some aspects, the material in the first stream may be collected for further processing.

The second stream may include smaller, less dense, and/or lighter particles. In some aspects, the lighter particles may include micron and/or sub-micron sized particulates. The second stream may be directed to the fines collector 2130.

In some aspects, the fines separator 2125 may be configured to separate fluff from the particulates. In some aspects, the fines separator 2125 may be configured to separate conglomerate from the particulates. In some aspects, the fines separator 2125 may be configured to separate heavy fines, such as fluff and/or conglomerate, from lighter particles, such as micron or submicron-sized particulates. Various features and details relating to an example fines separator 2125 may be described respect to the material separation devices 170, 175 shown and described with respect to FIGS. 8 and 10, and with regard to FIG. 24, item 1.

The fines collector 2130 may be configured to capture particulates larger than a particular size threshold, including, for example, features as may be required to meet local clean air or other requirements. For example, in some aspects, the fines collector 2130 may be configured to capture particles 10 μm or larger. In another example, the fines collector 2130 may be configured to capture particles 2.5 μm or larger. In some aspects, the fines collector 2130 may be a bag house. Various features and details relating to an example bag house and/or other features that may also be usable with this component 2130 are also shown and described with regard to the fines collector 2320 of FIG. 22. In some aspects, air passing through the fines collector 2130 may be released to the environment or recirculated to the mechanical pulverizer 2110. In some aspects, the particles captured by the fines collector 2130 may be directed to the device for further processing 2135.

The additional air filtration system 2135, may include, for example, features as may be required by local air quality requirements.

FIG. 21 shows a representative flow diagram 2200 of operation of various features of a system 2200, similar to the system 2100 shown in FIG. 21 and including other features. In operation, the example system 2200 may include various features for dewatering/drying a variety of organic pre-sorted feedstock, including, for example, the following operations/functions shown in FIG. 21.

The system 2200 may include a shredder 2205 configured to shred organic feedstock to an appropriate size or sizes based on pre-sorted feedstock origin and moisture level.

The system 2200 may include one or more material analyzers or sensors 2207. The material analyzer 2207 may be configured to be used to obtain/provide information on the pre-sorted feedstock about to enter the mechanical pulverizer 2210 and transmit the information on the pre-sorted feedstock to the mechanical pulverizer 2210 and/or the computer system 1900. The material analyzer 2207 may also be configured to analyze materials leaving the mechanical pulverizer 2210 and transmit the information to the computer system 1900. The material analyzer 2207 may also be configured to analyze materials received in the collector 2233 and/or in the first stream and transmit the information to the computer system. In some aspects, the system may include an air quality analyzer or sensor 2208. The air quality analyzer may be configured to analyze air exiting the mechanical pulverizer 2210, a cyclone 2115, a filtration and/or air conditioning system 2225, and/or a blower 2230, all of which are described in greater detail below.

The system 2200 may include a mechanical pulverizer 2210, such as a horizontal hammermill and/or a ringmill. In some aspects, the mechanical pulverizer 2210 may be similar to the mechanical pulverizer 2100. Organic pre-sorted feedstock appropriately sized and containing no more than 60% of moisture (water or other fluids) by weight, along with air (e.g., ambient or preconditioned) may enter a mechanical pulverizer 2210, such as a horizontal hammermill and/or a ringmill. As used herein, "pre-conditioned" may refer to pre-sorted feedstock (and/or air entering the mechanical pulverizer 2210) that has been heated and/or dehumidified. In some aspects, the system 2200 may include downstream waste processing components, such as a boiler, a gasifier, a pyrolizer, and so forth. In such aspects, the system 2200 may be configured so that waste heat from the boiler, gasifier, and/or boiler is able to be used to heat and/or dehumidify the pre-sorted feedstock and/or air entering the mechanical pulverizer 2210. The air may enter the mechanical pulverizer 2210 at a point above, below, or sideways from the pre-sorted feedstock. One or more material analyzers/sensor(s) 2207 may also be used to obtain/provide information on the pre-sorted feedstock about to enter the mechanical pulverizer 2210.

The pre-sorted feedstock may be exposed to the air blower 2230 and/or other air conveying features, such as the air conveyor 2115, while in the mechanical pulverizer 2210. For example, an air blower may be located external to the mechanical pulverizer 2210 and may pull or push ambient (or, for example, preconditioned) high velocity air through the mechanical pulverizer 2210. The mechanical pulverizer 2210 may pulverize the pre-sorted feedstock, thereby increasing the surface area of the pre-sorted feedstock, while high velocity air flow may mix air with the pre-sorted feedstock as the pre-sorted feedstock is being pulverized. The pulverized air-conveyed feedstock may include small particles (e.g., less than 20 microns). The fine particles may absorb moisture from the pre-sorted feedstock. The airflow may carry the dried, pulverized air-conveyed feedstock (to predetermined level of moisture) from the mechanical pulverizer 2210 through one or more specially designed mechanical pulverizer exit screens, such as the screens 2120 of FIG. 20. The plurality of openings in the screens 2120 may maintain larger conglomerates within the mechanical pulverizer 2210 for a longer period of time (i.e., increasing residence time) as moisture bound to the smaller particles exits the mechanical pulverizer 2210 after a short residence time, thereby allowing moisture to be separated from the larger pieces of pre-sorted feedstock in the mechanical pulverizer 2210.

The exiting pulverized feedstock may be air-conveyed (e.g., via high velocity air) to a fines separator 2215, such as a cyclone, to separate the air-conveyed feedstock into a first stream and a second stream. The first stream may include heavy fines separated from the air-conveyed pulverized feedstock. The high velocity air with the heavy fines may be collected (e.g., by a collector 2233) and/or sent to a device for further processing 2235, for example as described with regard to FIG. 20.

The second stream includes smaller fines (e.g., particulates), which may not be removed from the airflow by the fines separator 2215. The smaller fines in the second stream may be filtered for fine particulates at a fines collector 2220, such as a bag house. High velocity filtered air exiting from the bag house may undergo other filtering/cleanup via other filtering/conditioning mechanisms 2225, such as may needed prior to release to ambient air.

FIG. 22 shows yet another example implementation of a system 2300 having similar features to those as described with respect to FIGS. 20 and 21. As shown in FIG. 22, material coming from a mechanical pulverizer (such as the mechanical pulverizers 2110, 2210) may be conveyed through ducting or other conveying structures to a fines separator 2315, such as a cyclone (such as a hydrocyclone) (1). Heavy material may be removed via rotary airlock at bottom (2) 2316 and conveyed to storage and/or pellet mill. Fugitive air and fines from the fines separator 2315 may be conveyed via ducting (3) 2319, for example, to a fines collector 2320, such as a baghouse (4) where fines may be separated (e.g., per local air quality codes) from fugitive air via rotary airlock (2) 2316'. Fines may be conveyed in order to be combined with material collected from the cyclone for pellet mill production and/or storage, for example. After filtration, fugitive air may move thru duct (5) 2321 from fines collector 2320 to air conveyor 2330, such as a fan (6). Fugitive air may then be released 2375, such as to atmosphere (7), for example.

Figure 23:
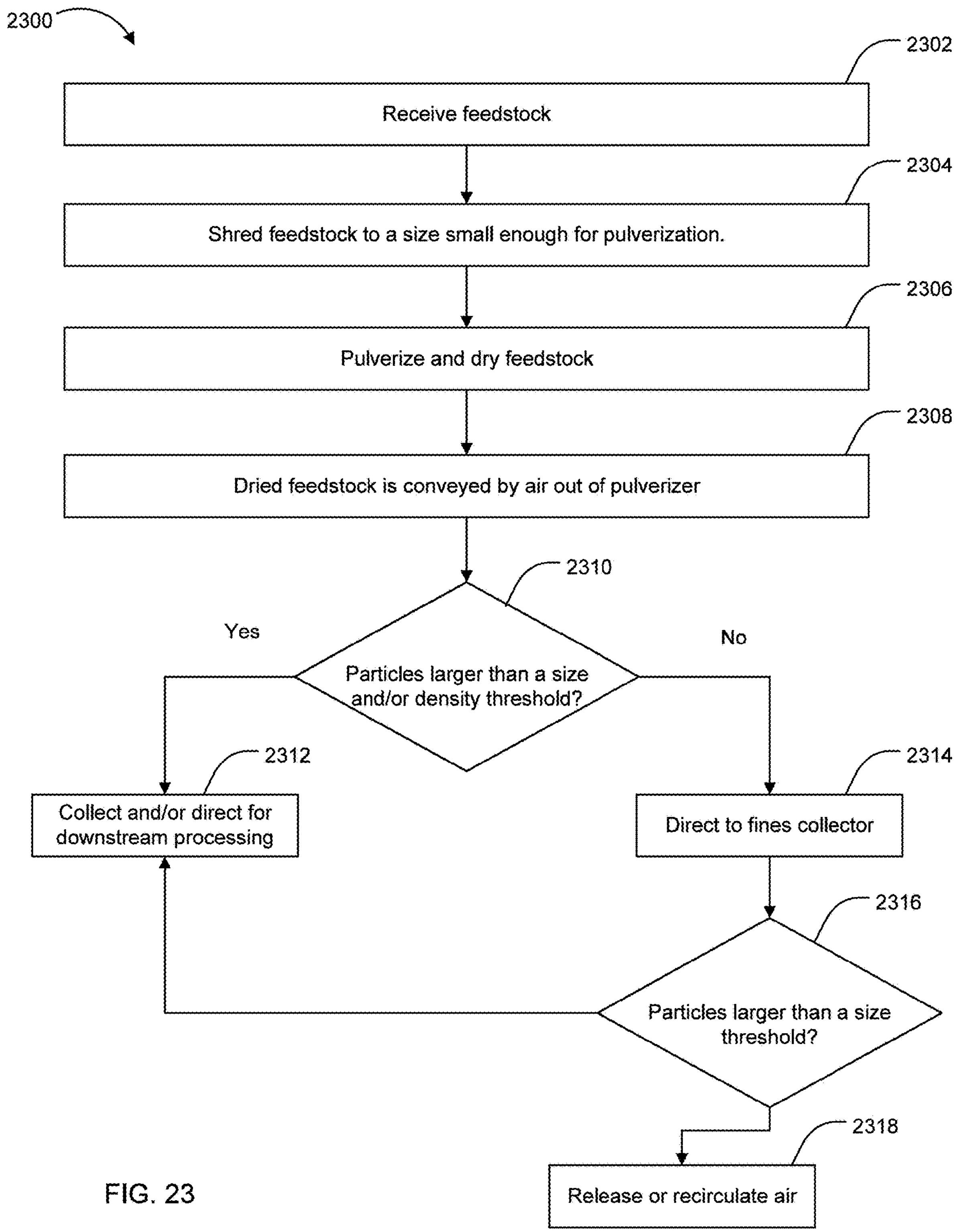
FIG. 23 is a block diagram of an example process for separating, mechanical drying and downstream processing of pre-sorted feedstock.

FIG. 23 illustrates a process 2300 for separating, mechanical drying and downstream processing of pre-sorted feedstock. This process is described relative to the system 2100 of FIG. 20.

At block 2302, pre-sorted feedstock is received by the shredder 2105. The pre-sorted feedstock may include one or more of pre-sorted municipal solid waste, MRF waste, biosolids, agricultural waste, paper pulp, green waste, digestate, other biomass, and so forth. In some aspects, one or more characteristics of the feedstock may be determined at block 3202. Example characteristics of the feedstock may include a moisture content and/or a calorific content of the feedstock. In some aspects, the material composition of the pre-sorted feedstock received by the shredder 2105 may be determined and/or changed based on the calorific content of the feedstock and/or the calorific content of the material in the first stream of heavier air-conveyed particles (block 2312).

At block 2304, the shredder shreds the pre-sorted feedstock to a size suitable for processing by the mechanical pulverizer 2110. The shredded pre-sorted feedstock is then transported to the mechanical pulverizer 2110. In some aspects, a rate of transportation of the shredded pre-sorted feedstock to the mechanical pulverizer 2110 may be determined based on the moisture content of the feedstock.

At block 2306, the mechanical pulverizer 2110, such as a ringmill, a horizontal hammermill, and/or a VSI, may pulverize the pre-shredded feedstock into heavy fines and particulates. In some aspects, the particulates may be 20 μm or smaller. In some aspects, the particulates may be 10 μm or smaller. In some aspects, the particulates may be 2.5 μm or smaller. At block 2306, the pre-sorted feedstock in the mechanical pulverizer 2110 may be exposed to airflow generated by the air conveyer 2115. The particulates may serve as nucleation sites for moisture molecules released by the pre-sorted feedstock as it is pulverized and binds to the moisture molecules, thereby drying the pre-sorted feedstock in as it is pulverized. Various components of the pre-sorted feedstock may remain in the mechanical pulverizer 2100 until they are small enough to pass through the screen 2120. Thus, smaller particles (e.g., particulates), which are typically bound to moisture molecules, may quickly pass through the mechanical pulverizer 2110, taking moisture away from the larger pre-sorted feedstock as it continues to be pulverized. In some aspects, the mechanical pulverizer 2110 may dry the feedstock from a moisture content of 60 wt. % to a moisture content of less than 35 wt. %, for example. In some aspects, the dried feedstock may have a moisture content of less than 20 wt. %. In some aspects, the dried feedstock may have a moisture content of less than 15 wt. %. In some aspects, the velocity produced by the air conveyor 2115 may be determined based on a moisture content of the shredded pre-sorted feedstock entering the pulverizer 2105 and/or a moisture content of the material in the first stream of heavier air-conveyed particles (block 2312).

At block 2308, dried pulverized feedstock may be air-conveyed (e.g., transported by airflow) out of the mechanical pulverizer 2110.

At block 2310, air-conveyed feedstock may be separated based on particle size and/or density, for example by the fines separator 2125. The fines separator 2125 may be configured to separate the stream of air-conveyed feedstock into a first stream and a second stream based on a size and/or a density threshold.

At block 2312, the first stream of heavier air-conveyed particles may be collected and/or directed to a device for further processing 2135, such as a pellet mill, a pyrolizer, and so forth. The first stream may include ERDF material such as heavy fines, such as fluff and/or conglomerate. In some aspects, information indicative of a characteristic of the material in the first stream of heavier air-conveyed particles may be determined. Example characteristics may include a moisture content and/or a caloric content.

At block 2314, the second stream may be directed to the fines collector 2130, such as a bag house. The second stream may include small, light, and/or less dense particles, such as particulates. The fines collector may capture particulates larger than a particular size threshold. For example, in some aspects, the fines collector 2130 may capture particles 10 μm or larger. In another example, the fines collector may capture particles 2.5 μm or larger.

At block 2316, the particles captured by the fines collector 2130 may be collected and/or directed to the device for further processing 2135.

At block 2318, air passing through the fines collector 2130 may be released to the environment or recirculated to the mechanical pulverizer 2110.

Figure 18:
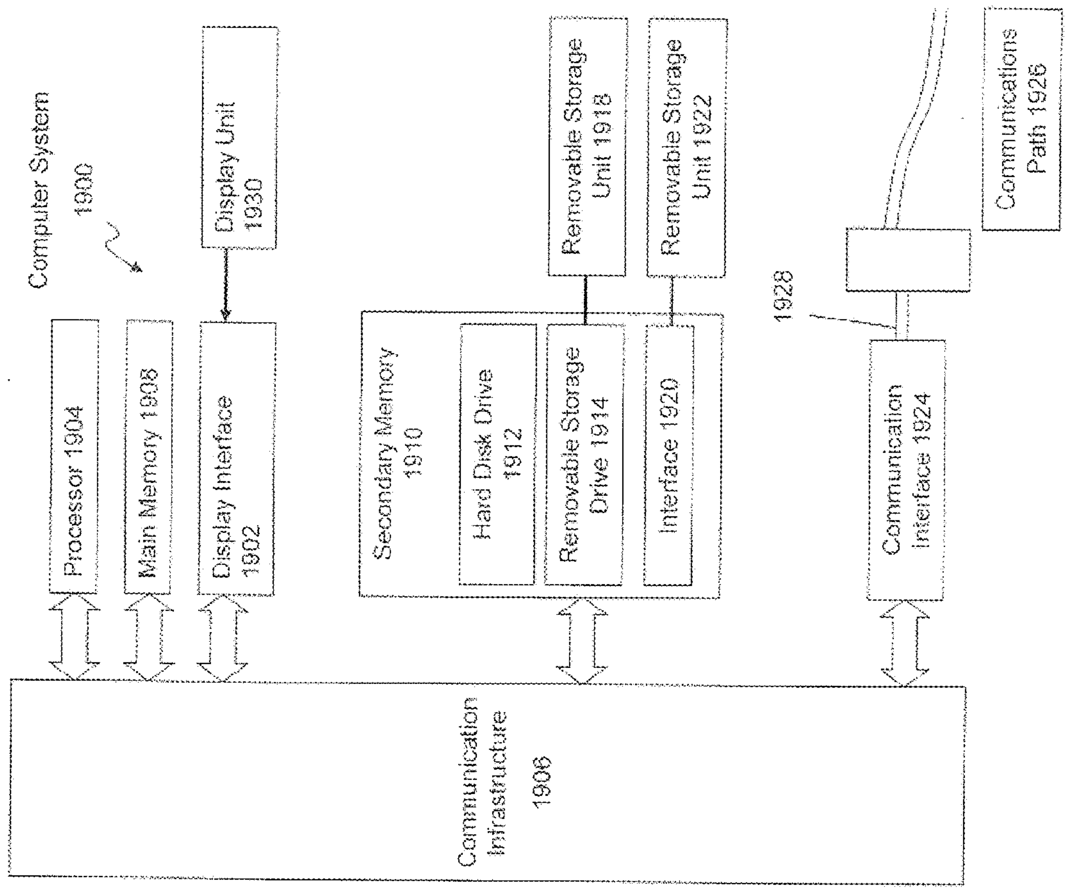
FIG. 18 contains a representative diagram of example computer system components capable of carrying out various functionality described in example implementations of a control system and other processes in accordance with aspects of the present disclosure.

Per above, aspects of the systems, devices, and methods of the present disclosure may include a control system for managing and/or controlling the monitoring, operation, and/or interoperation of the various processing devices within a processing system, as well as overall operation of the system, which may be implemented using hardware, software or a combination thereof and may be implemented in one or more computer systems or other processing systems. In one variation, various aspects are directed toward one or more computer systems capable of carrying out the functionality described herein. An example of such a computer system 1900 is shown in FIG. 18.

Computer system 1900 includes one or more processors, such as processor 1904. The processor 1904 may be connected to a communication infrastructure 1906 (e.g., a communications bus, cross-over bar, or network). Various software aspects are described in terms of this example computer system. After reading this description, it will become apparent to a person skilled in the relevant art(s) how to implement the aspects hereof using other computer systems and/or architectures.

Computer system 1900 may include a display interface 1902 that forwards graphics, text, and other data from the communication infrastructure 1906 (or from a frame buffer not shown) for display on the display unit 1930. Computer system 1900 also includes a main memory 1908, preferably random access memory (RAM), and may also include a secondary memory 1910. The secondary memory 1910 may include, for example, a hard disk drive 1912 and/or a removable storage drive 1914, representing a floppy disk drive, a magnetic tape drive, an optical disk drive, etc. The removable storage drive 1914 may read from and/or write to a removable storage unit 1918 in a well-known manner. Removable storage unit 1918, may represent a floppy disk, magnetic tape, optical disk, etc., which is read by and written to removable storage drive 1914. As will be appreciated, the removable storage unit 1918 may include a computer usable storage medium having stored therein computer software and/or data.

In alternative variations, secondary memory 1910 may include other similar devices for allowing computer programs or other instructions to be loaded into computer system 1900. Such devices may include, for example, a removable storage unit 1922 and an interface 1920. Examples of such may include a program cartridge and cartridge interface (such as that found in video game devices), a removable memory chip (such as an erasable programmable read only memory (EPROM), or programmable read only memory (PROM)) and associated socket, and other removable storage units 1922 and interfaces 1920, which allow software and data to be transferred from the removable storage unit 1922 to computer system 1900.

Computer system 1900 may also include a communications interface 1924. Communications interface 1924 allows software and data to be transferred between computer system 1900 and external devices. Examples of communications interface 1924 may include a modem, a network interface (such as an Ethernet card), a communications port, a Personal Computer Memory Card International Association (PCMCIA) slot and card, etc. Software and data transferred via communications interface 1924 may be in the form of signals 1928, which may be electronic, electromagnetic, optical or other signals capable of being received by communications interface 1924. These signals 1928 may be provided to communications interface 1924 via a communications path (e.g., channel) 1926. This path 1926 may carry signals 1928 and may be implemented using wire or cable, fiber optics, a telephone line, a cellular link, a radio frequency (RF) link and/or other communications channels. In this document, the terms “computer program medium” and “computer usable medium” are used to refer generally to media such as a removable storage drive 1914, a hard disk installed in hard disk drive 1912, and signals 1928. These computer program products provide software to the computer system 1900. Aspects of the invention are directed to such computer program products.

Computer programs (also referred to as computer control logic) are stored in main memory 1908 and/or secondary memory 1910. Computer programs may also be received via communications interface 1924. Such computer programs, when executed, enable the computer system 1900 to perform the features in accordance with aspects of the invention, as discussed herein. In particular, the computer programs, when executed, enable the processor 1904 to perform such features. Accordingly, such computer programs represent controllers of the computer system 1900.

In a variation where aspects of the present disclosure are implemented using software, the software may be stored in a computer program product and loaded into computer system 1900 using removable storage drive 1914, hard drive 1912, or communications interface 1924. The control logic (software), when executed by the processor 1904, may cause the processor 1904 to perform the functions as described herein. In another variation, aspects of the present disclosure are implemented primarily in hardware using, for example, hardware components, such as application specific integrated circuits (ASICs). Implementation of the hardware state machine so as to perform the functions described herein will be apparent to persons skilled in the relevant art(s).

In yet another variation, aspects of the present disclosure are implemented using a combination of both hardware and software.

Figure 19:
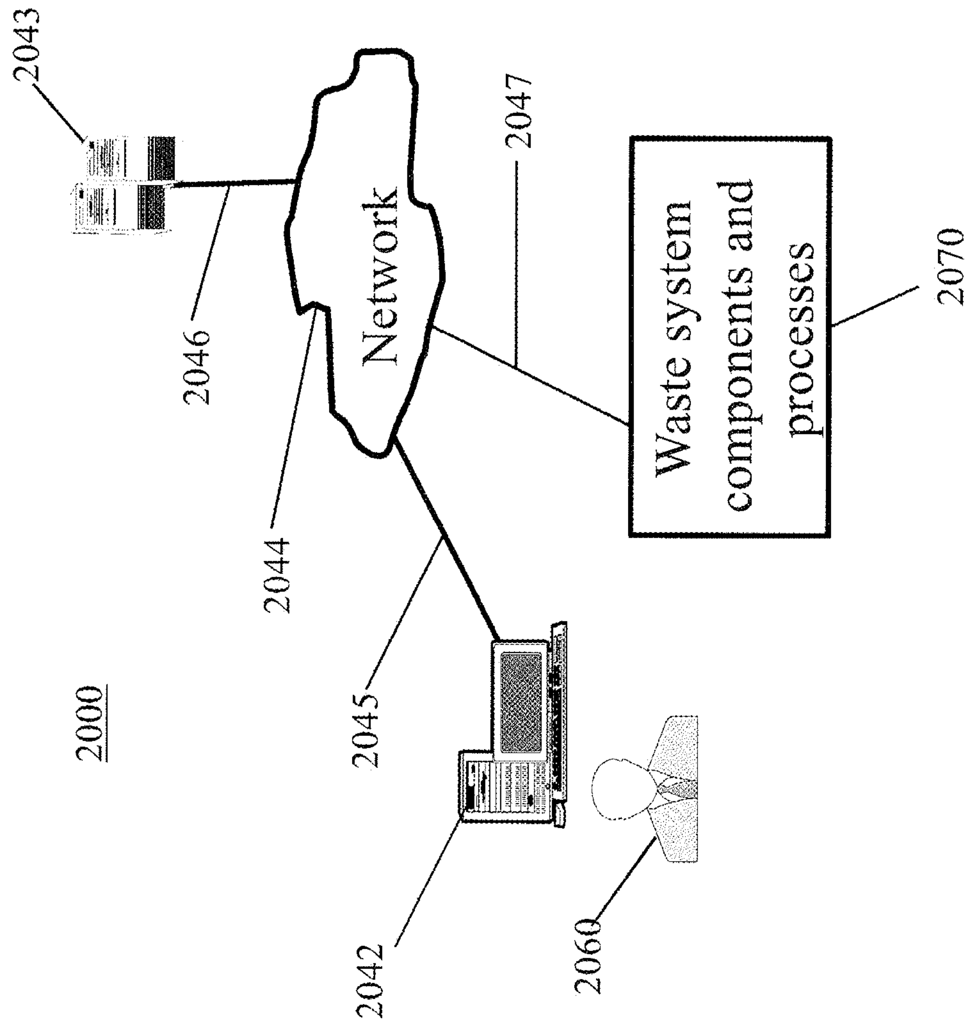
FIG. 19 is a block diagram of various example system components on a network for use in accordance with aspects of the present disclosure.

As shown in FIG. 19, in an example implementation of a system 2000 in accordance with aspects of the present disclosure, various features for use in conjunction with systems and methods in accordance with aspects of present disclosure, including, but not limited to a control system for managing and/or controlling the monitoring, operation, and/or interoperation of various processing devices and processes within a waste processing system 2070 may, for example, be accessed by an accessor 2060 (also referred to interchangeably herein as a “user”) via a terminal 2042, such as a personal computer (PC), minicomputer, mainframe computer, microcomputer, telephonic device, or wireless device, such as a hand-held wireless device coupled to a server 2043, such as a PC, minicomputer, mainframe computer, microcomputer, or other device having a processor and a repository for data and/or coupling to a processor and/or repository for data, via, for example, a network 2044, such as the Internet or an intranet, and couplings 2045, 2046, 2047. The couplings 2045, 2046, 2047 may include, for example, wired, wireless, or fiberoptic links. In another example implementation, a method and system in accordance with aspects of the present disclosure may operate in a stand-alone environment, such as on a single terminal.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean “one and only one” unless specifically so stated, but rather “one or more.” All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of the processes/flowcharts disclosed is an illustration of example approaches. Based upon design preferences, it is understood that the specific order or hierarchy in the processes/flowcharts may be rearranged. Further, some features/steps may be combined or omitted. The accompanying method claims present elements of the various features/steps in a sample order, and are not meant to be limited to the specific order or hierarchy presented.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

The invention claimed is:

1. A method for processing a feedstock, the method comprising:

pulverizing the feedstock into fines and moisture, the fines comprising heavy fines and particulates;

imparting airflow to communicate the fines to a fines separator;

separating heavy fines from the particulates;

communicating the particulates and moisture from the fines separator to a fines collector;

separating the particulates from the airflow and moisture exiting the fines collector;

receiving information indicative of at least one characteristic of the heavy fines; and determining a velocity of the airflow based on the at least one characteristic of the heavy fines.

2. The method of claim 1, wherein the at least one characteristic of the heavy fines includes a moisture content.

3. The method of claim 1, further comprising:

providing the feedstock to a pulverizer at a rate determined based on the at least one characteristic of the heavy fines.

4. The method of claim 1, wherein the at least one characteristic includes a caloric content; and wherein the method further comprises:

changing a composition of the feedstock based on the at least one characteristic of the heavy fines.

5. The method of claim 1, further comprising:

providing the feedstock to a pulverizer at a rate determined based on at least one of characteristic of the feedstock.

6. The method of claim 5, wherein the at least one characteristic of feedstock includes a moisture content.

7. The method of claim 1, wherein the at least one characteristic includes a caloric content; and wherein the method further comprises:

changing a composition of the feedstock based on the at least one characteristic of the feedstock.

8. The method of claim 1, wherein the feedstock entering the mechanical pulverizer has a moisture content of about 20 to 60 wt. %.

9. The method of claim 1, wherein the airflow imparted to communicate the fines to the fines separator is at temperatures between −20° F. to 100° F.

10. The method of claim 1, wherein the fines separator is configured to separate the heavy fines from the particulates based on one or more of weight, density, and particle size.

11. The method of claim 1, wherein the heavy fines comprise one or more of conglomerate, fluff, and combinations thereof.

12. The method of claim 1, wherein the particulates comprise materials not removed from the air flow by the fines separator.

13. The method of claim 1, wherein a moisture content of the pulverized feedstock in the air flow from the mechanical pulverizer is not greater than 35% by weight.

14. The method of claim 1, wherein the velocity of the air flow is between about 1000-24,000 feet/minute (ft/min).

15. The method of claim 1, wherein the mechanical pulverizer comprises a ringmill, a horizontal hammermill, or a vertical shaft impactor (VSI).

16. The method of claim 1, wherein the fines separator comprises a cyclone.

17. The method of claim 1, wherein the at least one characteristic of the heavy fines includes at least one of a moisture content and a calorific content.

* * * * *